(12) United States Patent
Asirvatham et al.

(10) Patent No.: US 12,024,584 B2
(45) Date of Patent: Jul. 2, 2024

(54) METHODS AND COMPOSITIONS FOR POLYURETHANE DISPERSIONS USING CAPROLACTAM-DERIVED SOLVENTS

(71) Applicant: AdvanSix Resins & Chemicals LLC, Parsippany, NJ (US)

(72) Inventors: Edward Asirvatham, Chatham, NJ (US); Céline de Lame, Pry (BE); Jaime A. Flores-Vasquez, Glen Allen, VA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

(21) Appl. No.: 17/993,382

(22) Filed: Nov. 23, 2022

(65) Prior Publication Data

US 2023/0093825 A1     Mar. 30, 2023

Related U.S. Application Data

(63) Continuation of application No. 16/611,384, filed as application No. PCT/US2018/038924 on Jun. 22, 2018, now Pat. No. 11,542,360.

(Continued)

(51) Int. Cl.
    *C08G 18/08*      (2006.01)
    *C08G 18/10*      (2006.01)
    (Continued)

(52) U.S. Cl.
    CPC ......... *C08G 18/76* (2013.01); *C08G 18/0823* (2013.01); *C08G 18/0852* (2013.01);
    (Continued)

(58) Field of Classification Search
CPC .... C08G 18/10; C08G 18/76; C08G 18/3206; C08G 18/73; C08G 18/0852; C08G 18/0823; C08G 18/8077; C08G 18/4854
See application file for complete search history.

(56) References Cited

U.S. PATENT DOCUMENTS

| | | | |
|---|---|---|---|
| 6,710,120 B2 | 3/2004 | Gertzmann et al. |
| 11,542,360 B2 | 1/2023 | Asirvatham et al. |

(Continued)

FOREIGN PATENT DOCUMENTS

| | | | |
|---|---|---|---|
| CN | 1934153 A | 3/2007 |
| CN | 101802038 A | 8/2010 |

(Continued)

OTHER PUBLICATIONS

DE-102007028890_May 2008_English Translation.
(Continued)

*Primary Examiner* — Michael L Leonard
(74) *Attorney, Agent, or Firm* — Faegre Drinker Biddle & Reath LLP

(57) ABSTRACT

Caprolactam-derived solvents for use as processing solvents and/or coalescing agents for polyurethane dispersions (PUDs). The caprolactam-derived solvents are suitable for processing solvents and coalescing agents in PUDs created through traditional PUD manufacturing processes or as coalescing agents in PUDs created through solvent-free PUD manufacturing processes. Blends of more than one caprolactam-derived solvent may be used as the processing solvent and/or coalescing agent.

8 Claims, 11 Drawing Sheets

Related U.S. Application Data

(60) Provisional application No. 62/579,636, filed on Oct. 31, 2017, provisional application No. 62/524,786, filed on Jun. 26, 2017.

(51) Int. Cl.
  *C08G 18/32* (2006.01)
  *C08G 18/48* (2006.01)
  *C08G 18/73* (2006.01)
  *C08G 18/76* (2006.01)
  *C08G 18/80* (2006.01)
  *C08K 5/09* (2006.01)

(52) U.S. Cl.
  CPC ......... *C08G 18/10* (2013.01); *C08G 18/3206* (2013.01); *C08G 18/4854* (2013.01); *C08G 18/73* (2013.01); *C08G 18/8077* (2013.01); *C08G 18/7671* (2013.01); *C08K 5/09* (2013.01)

(56) References Cited

U.S. PATENT DOCUMENTS

| | | | |
|---|---|---|---|
| 2012/0076932 A1* | 3/2012 | Buelow | C08G 18/12 427/207.1 |
| 2015/0353771 A1 | 12/2015 | Kendi | |
| 2017/0121537 A1* | 5/2017 | Mohr | C08G 18/348 |
| 2020/0223974 A1 | 7/2020 | Asirvatham et al. | |

FOREIGN PATENT DOCUMENTS

| | | |
|---|---|---|
| DE | 102007028890 A1 | 5/2008 |
| EP | 3510070 B1 | 8/2022 |
| JP | 2012-529547 A | 11/2012 |
| JP | 2013-227528 A | 11/2013 |
| JP | 2017-101198 A | 6/2017 |
| WO | 2015/189084 A1 | 12/2015 |
| WO | 2019/005596 A1 | 1/2019 |

OTHER PUBLICATIONS

EPO Examination Report published in patent application No. 18742632.5, 4 pages.

European Search Report for EP Patent Application No. 22191090.4, Issued on Jan. 16, 2023, 6 pages.

International Search Report and Written Opinion received for PCT Patent Application No. PCT/US2018/038924, mailed on Aug. 22, 2018, 7 pages.

\* cited by examiner

METHODS AND COMPOSITIONS FOR POLYURETHANE DISPERSIONS USING CAPROLACTAM-DERIVED SOLVENTS

CROSS REFERENCE TO RELATED APPLICATIONS

This application is a continuation application of U.S. patent application Ser. No. 16/611,384, filed Nov. 6, 2019, which is a U.S. 371 National Stage Application of International Application No. PCT/US2018/038924, filed Jun. 22, 2018, which claims the benefit under Title 35, U.S.C. § 119(e) of U.S. Provisional Patent Application Ser. No. 62/524,786, entitled METHODS AND COMPOSITIONS FOR POLYURETHANE DISPERSIONS USING CAPROLACTAM-DERIVED SOLVENTS, filed on Jun. 26, 2017, and of U.S. Provisional Patent Application Ser. No. 62/579,636, METHODS AND COMPOSITIONS FOR POLYURETHANE DISPERSIONS USING CAPROLACTAM-DERIVED SOLVENTS, filed on Oct. 31, 2017, the entire disclosures of which are expressly incorporated by reference herein.

FIELD

The present disclosure relates to solvents for the preparation and/or use of polyurethane dispersions and, in particular, to caprolactam-derived solvents for use as processing solvents and/or coalescing agents in polyurethane dispersions.

BACKGROUND

Polyurethane dispersions (PUDs) were developed several decades ago to address the increasing environmental demands on the adhesive industry to produce adhesives containing little or no solvents. In more recent years, PUDs have been used as coatings, adhesives, sealants, and elastomers, among other applications. PUDs are aqueous, anionic dispersions of high molecular weight polyurethanes, and offer the benefits of polyurethane polymers, such as toughness and scratch and chemical resistance, for a wide range of applications.

In general, PUDs are manufactured through one of two processes. A first process, referred to herein as the traditional PUD manufacturing process, includes first making a pre-polymer through a reaction between a polymeric diol, diisocyanate, and a hydrophilic agent in the presence of a processing solvent. The free acid group in the hydrophilic agent enhances the resin water solubility or dispersibility after neutralization with a base, preferably a nitrogen containing base.

However, production of PUD pre-polymers, especially those with low molecular weight and high solids, requires high amounts of processing solvents to control viscosity. N-alkyl pyrrolidones, especially N-methyl (NMP), N-ethyl (NEP), N-butyl (NBP) and other alkyl pyrrolidones, have been used as the processing solvents for many years. However, there is significant regulatory pressure to eliminate the use of N-alkyl pyrrolidones and other solvents due to toxicity concerns. For example, NMP and NEP have been classified as reproductive toxicity category 1B in Europe (European Commission Regulation (EC) No. 1272/2008 (CLP) and (EU) No. 944/2013, respectively, on Dec. 19, 2016), and NMP and similar chemical substances are currently under initial risk evaluation in the United States. As such, PUD producers have been in search of a suitable replacement for NMP. In recent years, one existing class of solvents for use in the traditional PUD manufacturing process include potentially less toxic NMP derivatives, such as those disclosed in U.S. Patent Application Publication No. 2015/0057375 to Vandeputte et al.

One alternative to using pyrrolidone based solvents includes using acetone or mixtures of acetone and/or methylethyl ketone (MEK) (see U.S. Pat. No. 4,820,762 to Tsaur) in place of NMP, for the manufacturing of PUDs. This process, referred to herein as a solvent-free PUD manufacturing process, includes the step of removing processing solvents prior to formulating the final dispersion product and, for this reason, the method is considered "solvent-free."

However, these solvent-free based processes are not free of disadvantages. For instance, copious amounts of MEK or acetone are typically required to attain a desired viscosity low enough for the pre-polymer such that the operation requires larger reaction and processing containers making these types of processes complex and expensive. In addition, since these solvents are not coalescing agents, they must be removed completely after making the polyurethane dispersion composition and prior to sale and/or application. Furthermore, the most commonly used hydrophilic agent for the production of the PUD resin, dimethylol propionic acid (DMPA), is not compatible with acetone and MEK, which have been used to replace NMP. As a result, the use of acetone and/or MEK solvents required the use of an expensive hydrophilic agent, dimethylolbutanoic acid (DMBA), which is compatible with such solvents. However, DMBA is significantly more expensive than DMPA. Another drawback to previous methods of formulating PUDs is the presence of residual solvents in the PUD resin which negatively impacts the film forming step in the dispersions. Thus, the customer or end-user has to add coalescing agents in order to achieve the coalescing effect, which adds cost.

In order to avoid the complex 'acetone' process, a 'melt' process may be used, in which the polyols, polyisocyanates and hydrophilic acid components are reacted without the use of any solvent. In this process, the chain extension step is completed after the neutralization and dispersion steps to avoid viscosity buildup. However, this 'melt' process suffers from high viscosities during the production of PUD resins and is not suitable for all the different types of polyols and polyisocyanates for yielding various types of PUD resin chain backbones.

In another process directed to avoid using N-alkyl pyrrolidones or ketones, monomers instead of polyols are reacted with polyisocyanates and hydrophilic agents to produce PUD resins. In this process, the monomers act as the solvent to enable controlling the viscosity during the process. One example is the use of acrylic monomers (acrylic/methacrylic acids and esters) for the production of PUDs. This type of process is complex and is only applied to acrylic modified PUDs and cannot be applicable to other polyol systems such as polyether, polyester, alkyd, polycarbonate (see U.S. Pat. No. 8,859,676), and polyamide, for example.

In other versions of PUDs, polyisocyanates having partially blocked isocyanate groups are used to produce "blocked PUD" systems, which may be used to modify the characteristics of the coating or paint such that a bake cure is required. Such blocked PUDs can be produced by partially blocking the polyurethane pre-polymer, made from polyols, polyisocyanates and a hydrophilic agent, by adding a blocking agent in such quantity that only a portion of the isocyanate groups in the pre-polymer are blocked. The remaining isocyanate groups enable the subsequent chain extension step for the production of PUDs. In another process, partially blocked polyisocyanates (HDI Trimer, IPDI Trimer) are used in the preparation of the pre-polymer. The preparation of blocked or partially blocked PUD systems is well known and described further in U.S. Pat. Nos. 4,098,933, 4,835,210, 5,157,074, 7,589,148 and 8,859,676. Controlling the viscosity during the preparation of such partially blocked PUD pre-polymer is even more critical due to the presence of isocyanate moieties from the blocked polyisocyanates.

Thus, what is needed are solvents that are inert and non-reactive (to diisocyanate), compatible with hydrophilic agents, hydrolytically stable over a broad pH range, offer good viscosity control of the PUD resin, are non-toxic and have high solvating power, a moderate evaporation rate, and low odor.

SUMMARY

The present disclosure provides caprolactam-derived solvents suitable for use as processing solvents and/or coalescing agents in polyurethane dispersions (PUDs). More particularly, the caprolactam-derived solvents are suitable for use as processing solvents and coalescing agents in PUDs created through traditional PUD manufacturing processes or as coalescing agents in PUD dispersions created through solvent-free PUD manufacturing processes. Also, blends of more than one caprolactam-derived solvent may be used as the processing solvent and/or coalescing agent.

In one form thereof, the present disclosure provides a method of forming a polyurethane dispersion including the steps of: forming a pre-polymer from a polymeric diol, at least one of a polyisocyanate and a diisocyanate, and a hydrophilic agent dissolved in at least one solvent, the at least one solvent in the form of a caprolactam derivative of the formula:

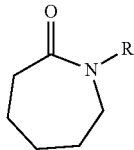

where R is a 1-5 carbon unsubstituted or substituted alkyl group; adding at least one base to the pre-polymer; and dispersing the pre-polymer in water.

The alkyl group may be selected from methyl, ethyl, propyl, iso-propyl, butyl, iso-butyl, and a substituted alkyl.

In the method, at least one of the following conditions may be present: the at least one base is an amine; the polymeric diol includes at least one polymeric diol selected from a polyether polyol, a polyester polyol, a polycarbonate polyol, a polyamide polyol, an acrylic polyol and combinations thereof; the at least one of the polyisocyanate and the diisocyanate is diisocyanate, which includes at least one diisocyanate selected from a aliphatic diisocyanate and an aromatic diisocyanate and combinations thereof; and the hydrophilic agent is selected from the group consisting of dimethylol propionic acid, dimethylol butanoic acid, and combinations thereof.

The at least one solvent may include a blend of at least two of N-methyl caprolactam, N-ethyl caprolactam, and N-butyl caprolactam.

The blend may include a first solvent in a range of 25-75 wt. %, and a second solvent in a range of 75-25 wt. %, based on the combined weight of the first and second solvents. The first solvent may be N-methyl caprolactam, and the second solvent may be N-ethyl caprolactam. The blend may include about 50 wt. % of N-methyl caprolactam and about 50 wt. % N-ethyl caprolactam %, based on the combined weight of the first and second solvents.

The blend may include a first solvent and a second solvent, a ratio between the first solvent and the second solvent being one of 2:1, 1:1, or 1:2.

The method may further include the step of using a blocking agent to at least partially block the pre-polymer.

In another form thereof, the present disclosure provides a polyurethane dispersion composition including a polyurethane formed of a polymeric diol, at least one of a polyisocyanate and a diisocyanate, and a hydrophilic agent dispersed in a solution of water and one of a caprolactam-derived N-alkyl solvent and an open chain ester amide.

The caprolactam-derived N-alkyl solvent may be of the formula

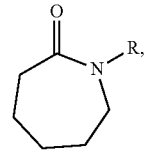

and the open chain ester amide may be of the formula

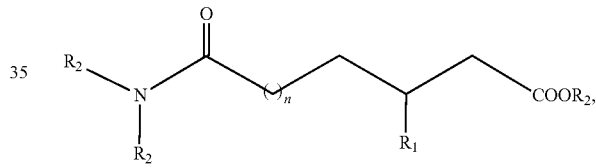

wherein n=0 or 1, $R_1$ is H or methyl, and R and $R_2$ are each a 1-5 carbon unsubstituted or substituted alkyl group selected from methyl, ethyl, propyl, iso-propyl, butyl, and iso-butyl.

In the polyurethane dispersion composition, the alkyl group may be one of methyl, ethyl, propyl, iso-propyl, butyl, iso-butyl and a substituted alkyl.

In the polyurethane dispersion composition, the one of the caprolactam-derived N-alkyl solvent and the open chain ester amide may constitute between about 1 wt. % and about 10 wt. % of the dispersion. In the polyurethane dispersion composition, the one of the caprolactam-derived N-alkyl solvent and the open chain ester amide may constitute between about 3 wt. % and about 6 wt. % of the composition.

In another form thereof, the present disclosure provides a method of forming a polyurethane dispersion including the steps of: forming a pre-polymer from a polymeric diol, at least one of a polyisocyanate and a diisocyanate, and a hydrophilic agent dissolved in at least one processing solvent; adding at least one base to the pre-polymer; dispersing the pre-polymer in water; removing the processing solvent from the polyurethane dispersion; adding a coalescing agent to the polyurethane dispersion, the coalescing agent being in the form of one of the formulas:

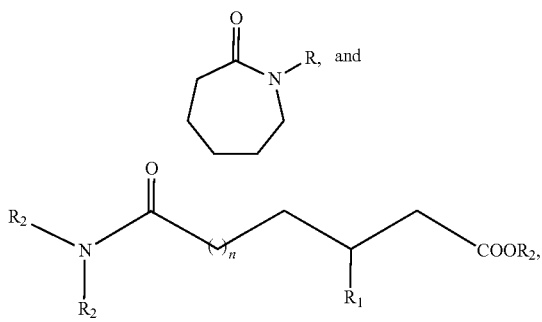

wherein n=0 or 1, $R_1$ is H or methyl, and R and $R_2$ are each a 1-5 carbon unsubstituted or substituted alkyl group selected from methyl, ethyl, propyl, iso-propyl, butyl, and iso-butyl.

The alkyl group may be selected from methyl, ethyl, propyl, iso-propyl, butyl, iso-butyl, and a substituted alkyl. The alkyl group may be methyl. The alkyl group may be ethyl.

In the method, at least one of the following conditions may be present: the processing solvent is selected from acetone and methyl ethyl ketone and combinations thereof; the at least one base is an amine; the polymeric diol includes at least one polymeric diol selected from a polyether polyol, a polyester polyol, a polycarbonate polyol, a polyamide polyol, an acrylic polyol and combinations thereof; the at least one of the polyisocyanate and the diisocyanate is diisocyanate, which includes at least one diisocyanate selected from a aliphatic diisocyanate and an aromatic diisocyanate and combinations thereof; and the hydrophilic agent is selected from the group consisting of dimethylol propionic acid, dimethylol butanoic acid, and combinations thereof, wherein when the processing solvent is selected from acetone and methyl ethyl ketone and combinations thereof, the hydrophilic agent is dimethyl butanoic acid.

The method may further include the step of using a blocking agent to at least partially block the pre-polymer.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

BRIEF DESCRIPTION OF THE DRAWINGS

The above mentioned and other features of the disclosure, and the manner of attaining them, will become more apparent and the disclosure itself will be better understood by reference to the following description of embodiments of the disclosure taken in conjunction with the accompanying drawings.

Figure 1:
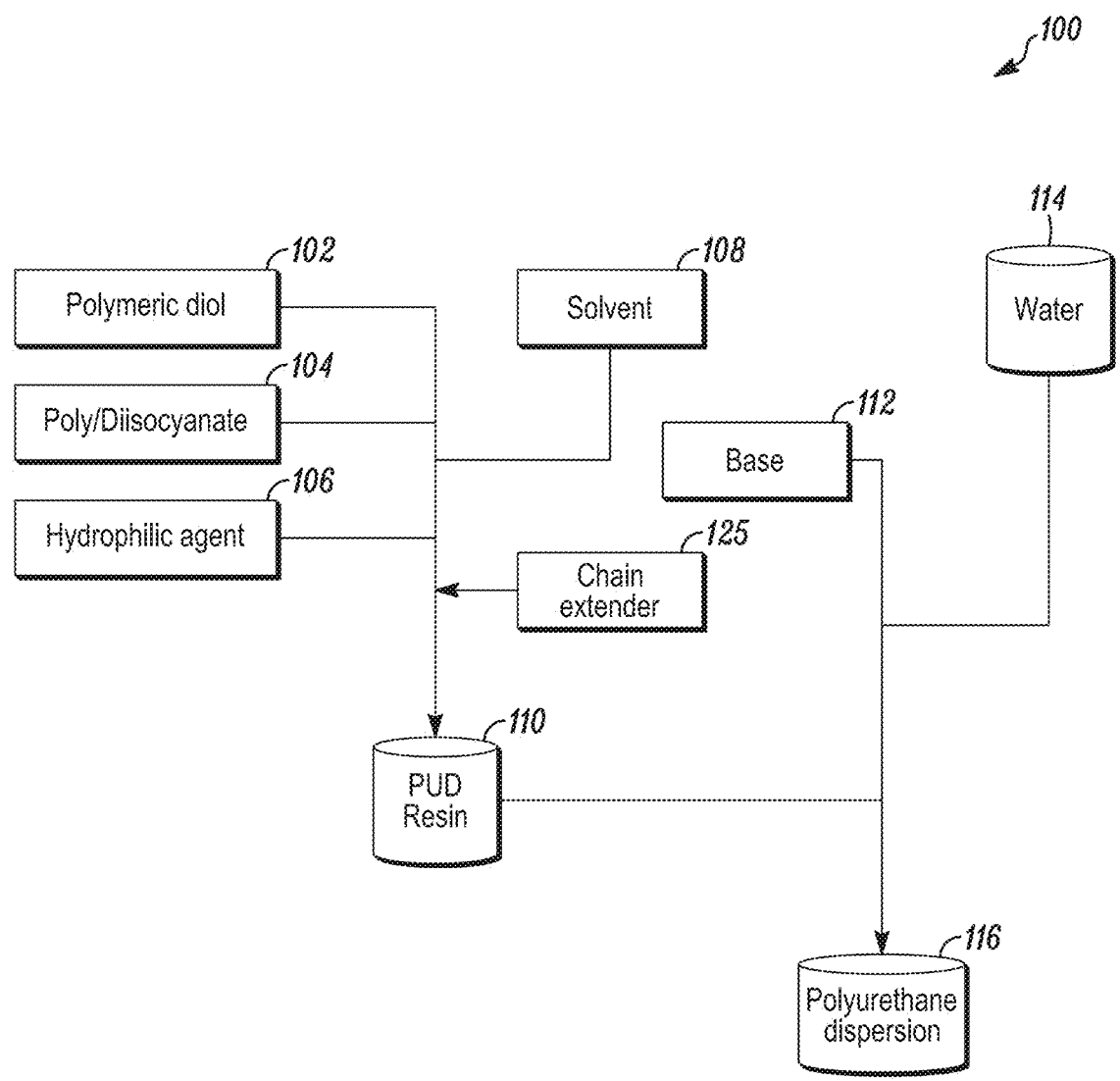
FIG. 1 is a diagram of a traditional PUD manufacturing process.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate one or more embodiment of the disclosure, and such exemplifications are not to be construed as limiting the scope of the disclosure in any manner.

DETAILED DESCRIPTION

The present disclosure provides caprolactam-derived solvents suitable for use as processing solvents and/or coalescing agents in PUD dispersions. More particularly, the caprolactam-derived solvents are suitable for processing solvents and coalescing agents in PUD dispersions created through traditional PUD manufacturing processes or as coalescing agents in PUD dispersions created through solvent-free PUD manufacturing processes.

I. Caprolactam-Derived Solvents.

Solvents of the present disclosure may be derived from caprolactam, and have one of the following general formulas (I) or (II):

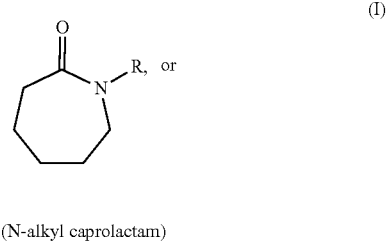

(N-alkyl caprolactam)

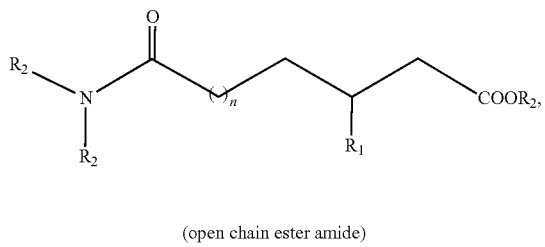

(open chain ester amide)

wherein n=0 or 1, $R_1$ is H or methyl, and R and $R_2$ are each a 1-5 carbon unsubstituted or substituted alkyl group, including methyl, ethyl, propyl, iso-propyl, butyl, or iso-butyl or a substituted alkyl group including a cyano, nitro, nitroso, formyl, or other polar substitute, such as 2-cyano ethyl. $R_2$ may also be benzyl. In one embodiment, n=0 and $R_1$ is methyl. In another embodiment, n=1 and $R_1$ is hydrogen.

As discussed further below, the solvents of the present disclosure may be used as processing solvents in the production of polyurethane pre-polymers and/or as coalescing agents in polyurethane dispersions.

There are several processes for the preparation of caprolactam-derived solvents (e.g. German Patent DE 2025172, German Patent DE 3735904, Romania Patent RO 102421, U.S. Pat. Nos. 3,865,814, 5,338,861, "N-Alkylation of Lactams with Phase Transfer Catalyst" by Takahata et al., HeteroCycles: An International Journal for Reviews and Communications in Heterocyclic Chemistry, 1979, Vol. 12, No. 11, pp. 1449-51, and "N-Substituted Derivatives of ε-caprolactam and Their Thermal and Chemical Behavior" by Cuiban et al., ARKIVOC Journal, Vol. 2002, Part (ii), pp. 56-63). One such method involves deprotonation of the amide group with a base such as sodium hydride or sodium metal, followed by alkylation with alkylation agents such as alkyl halides, dialkyl sulfates, or alkyl tosylates/acetates, followed by an aqueous workup to remove the byproducts. As one example, when the alkyl group on the caprolactam-derived solvent is 2-cyano ethyl, acrylonitrile is the preferred choice of alkylating agent.

There are also several methods for the preparation of solvents having open chain ester amides. One method involves cyclic imides such as 2-methylglutarimide or adipimide that are ring opened by means of alcohols followed by trans dialkylamidation. Another method involves transamidation of dialkyladipate or adipic acid mono acid chloride with dialkyl amine (e.g. PCT Patent Application Publication No. WO 2009/056477).

In various embodiments, the caprolactam-derived solvents may be used individually or two or more of the caprolactam-derived solvents may be blended together.

For example, in some embodiments, a caprolactam-derived solvent of the present disclosure may be a blended solvent composition including first and second different caprolactam-derived solvents. The first solvent may be present in an amount as little as 15 wt. %, 25 wt. %, 35 wt. %, or as great as 65 wt. %, 75 wt. %, or 85 wt. %, based on the total weight of the first and second solvents, or may be present in an amount within any range defined between any two of the foregoing values, such as between 15 wt. % and 85 wt. %, between 25 wt. % and 75 wt. %, or between 35 wt. % and 65 wt. %, for example.

The second solvent may also be present in an amount as little as 15 wt. %, 25 wt. %, 35 wt. %, or as great as 65 wt. %, 75 wt. %, or 85 wt. %, based on the total weight of the first and second solvents, or may be present in an amount within any range defined between any two of the foregoing values, such as between 15 wt. % and 85 wt. %, between 25 wt. % and 75 wt. %, or between 35 wt. % and 65 wt. %, for example.

Stated otherwise, the first and second caprolactam-derived solvents may be provided in various ratios, for example 1:1, 2:1, or 1:2.

More specifically, the caprolactam-derived solvent may include n-methyl caprolactam (N-MeCPL or NM CPL) present in an amount as little as 15 wt. %, 20 wt. %, or 25 wt. %, or as great as 65 wt. %, 75 wt. %, or 85 wt. %, based on the total weight of n-methyl caprolactam and n-ethyl caprolactam, or present in an amount within any range defined between any two of the foregoing values, and n-ethyl caprolactam (N-EtCPL or NE CPL) present in an amount as little as 15 wt. %, 20 wt. %, or 25 wt. %, or as great as 65 wt. %, 75 wt. %, or 85 wt. %, based on the total weight of n-methyl caprolactam and n-ethyl caprolactam, or present in an amount within any range defined between any two of the foregoing values.

Stated otherwise, n-methyl caprolactam and n-ethyl caprolactam may be provided in various ratios, for example 17:3, 3:1, 2:1, 1:1, 1:2, 1:3, or 3:17, or any ratio therebetween.

II. Formation of PUDs

A. Traditional PUD Manufacturing Process—Solvent Acting as Both Processing Solvent and Coalescing Agent.

With reference to FIG. 1, in the traditional PUD manufacturing process 100, a pre-polymer 110 is made through a reaction between a polymeric diol 102, and a poly- or di-isocyanate 104 in the presence of one or more of the solvents 108 discussed above in Part I and a chain extender 125. The pre-polymer or PUD resin 110 is generally of the formula:

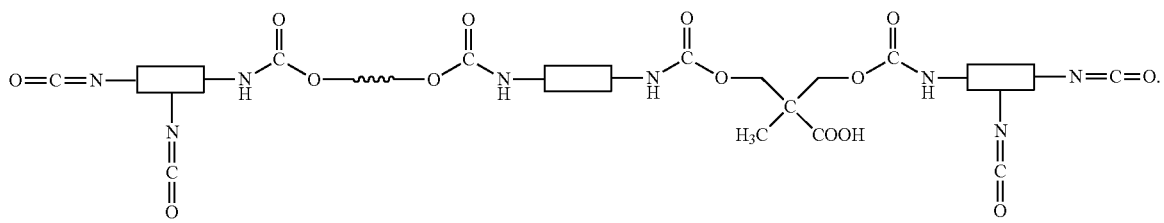

The reaction between the polymeric diol 102 and the poly- or di-isocyanate 104 further includes a hydrophilic agent 106 to introduce the carboxylic acid group. For example, the polymeric diol of the pre-polymer may be a hydroxyl-terminated polyether polyol, a polyester polyol, alkyds, polycarbonate polyol, polyamide polyol, or an acrylic polyol, the poly- or di-isocyanate may be one of an aliphatic diisocyanate or an aromatic diisocyanate or a polyisocyanate made of an aliphatic or an aromatic diisocyanate such as tris(hexamethylene diisocyanate) trimer or isophorone diisocyanate trimer, for example, and the hydrophilic agent may be either DMPA or polyethylene polyol-DMPA. Suitable chain extenders include dioal, alkylamine alcohols, and mixtures of amines and alcohols.

The chain-extended polyurethane pre-polymer or PUD resin 110 is subsequently mixed with at least one base or acid neutralizing agent 112 and dispersed in water 114 to create a polyurethane dispersion 116. The base or the neutralizing agent is provided to allow the pre-polymer 110 to be a water-soluble amine salt in the water 114. The base or neutralizing agent 114 is generally an amine such as trimethylamine, for example.

In this traditional manufacturing process, the caprolactam-derived solvent acts as both the processing solvent and the coalescing agent for the polyurethane dispersion, and the caprolactam-derived solvent may be present in an amount as little as 1 wt. %, 2 wt. %, or 3 wt. %, or as much as 6 wt. %, 8 wt. %, or 10 wt. %, based on the total weight of the polyurethane dispersion, or may be present in an amount within any range defined between any two of the foregoing values, such as 1 wt. % to 10 wt. % or 3 wt. % to 6 wt. %, for example.

B. Solvent-Free PUD Manufacturing Process—Solvent Acting as Coalescing Agent.

Figure 2:
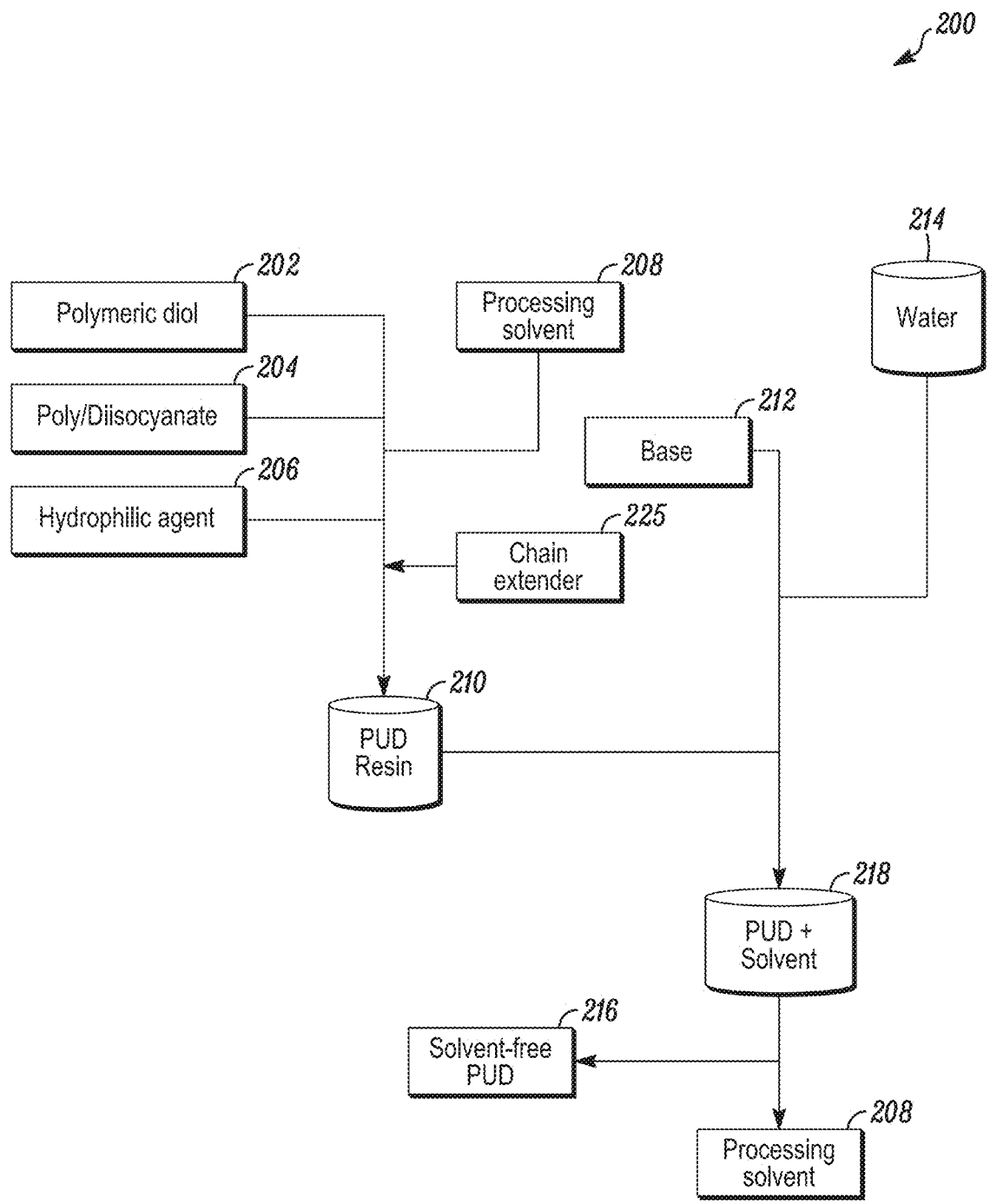
FIG. 2 is a diagram of a solvent-free PUD manufacturing process.

With reference to FIG. 2, in the solvent-free PUD manufacturing process 200, a pre-polymer or PUD resin 210 is made through a reaction between a polymeric diol 202, and a poly or di-isocyanate 204 in the presence of a processing solvent 208, typically acetone and/or methyl ethyl ketone (MEK), and a chain extender 225. The pre-polymer or PUD resin 210 is generally of the formula:

similar to pre-polymer/PUD resin 110. The reaction between the polymeric diol 202 and the diisocyanate 204 may further include a hydrophilic agent 206 to facilitate the reaction. The polymeric diol 202 of the pre-polymer/PUD resin 210 may be one of a polyether polyol, a polyester polyol, a polycarbonate polyol, a polyamide polyol, and an acrylic polyol, the diisocyanate 204 may be one of an aliphatic diisocyanate or an aromatic diisocyanate, and the hydrophilic agent 206 may be dimethyl butanoic acid (DMBA). The polyurethane pre-polymer 210 may then be mixed with at least one base 212, such as anamine, and dispersed in water 214 to create a solution 218 of the polyurethane dispersion 216 and the solvent 208.

The processing solvent 208 may be subsequently removed from the solution of the polyurethane dispersion 216 and the solvent 208 to create the solvent-free PUD 216. In particular, the solvent 208 may be removed from the solution via distillation or other similar methods.

However, in order for the solvent-free PUD 216 to exhibit good film formation, and to enhance film hardness, open time, drying time and other properties desired from waterborne polyurethane dispersions, a coalescing agent, namely one or more of the caprolactam-derived solvents discussed in Part I above, may be used to lower the minimum film forming temperature (MFFT). It may also be desired to use low volatile organic compound (VOC) coalescing agents in waterborne coatings. The caprolactam-derived solvents discussed above in Part I are low VOC coalescing agents and are suitable substitutes for volatile glycols, glycol ethers and alcohol esters in water-borne dispersions and emulsions.

C. PUDs with Blocked Isocyanates.

With reference to FIGS. 3a, 3b, 4a and 4b, either of the two manufacturing processes discussed above may be slightly altered to form PUDs that include at least one blocked isocyanate group. In general, approximately 60% to 90% equivalent mol % of the isocyanate groups (i.e., N=C=O groups (NCO)) of the polyisocyanate or diisocyanate are typically blocked on a given blocked PUD 326/426/526/626. As described below, the manufacturing processes discussed above may be altered in one of two ways such that the PUD formed includes at least one blocked isocyanate groups.

Figure 3A:
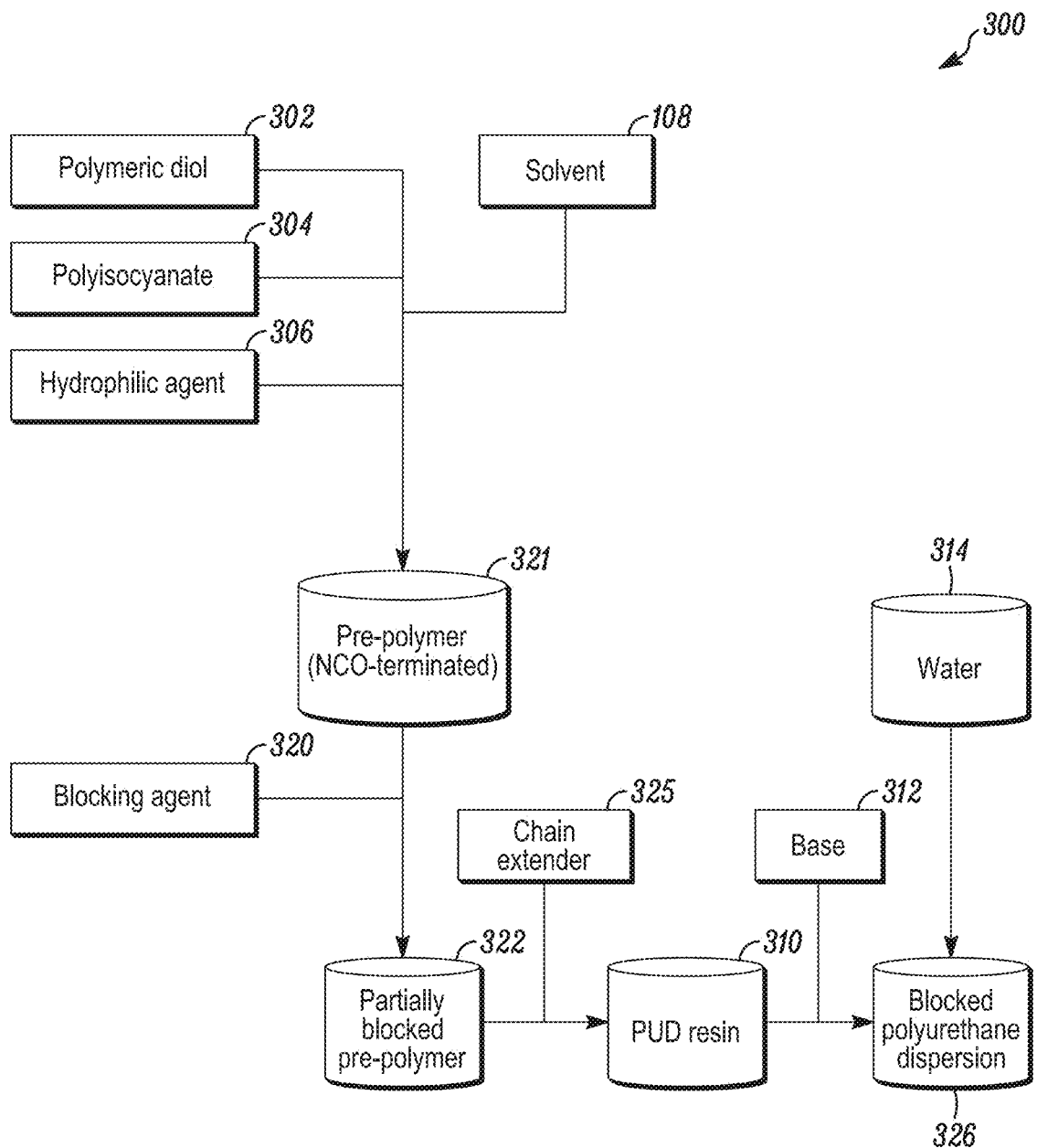
FIG. 3*a* is a diagram of a traditional PUD manufacturing process including introduction of a blocking agent to a pre-polymer to produce a blocked PUD.
Figure 3B:
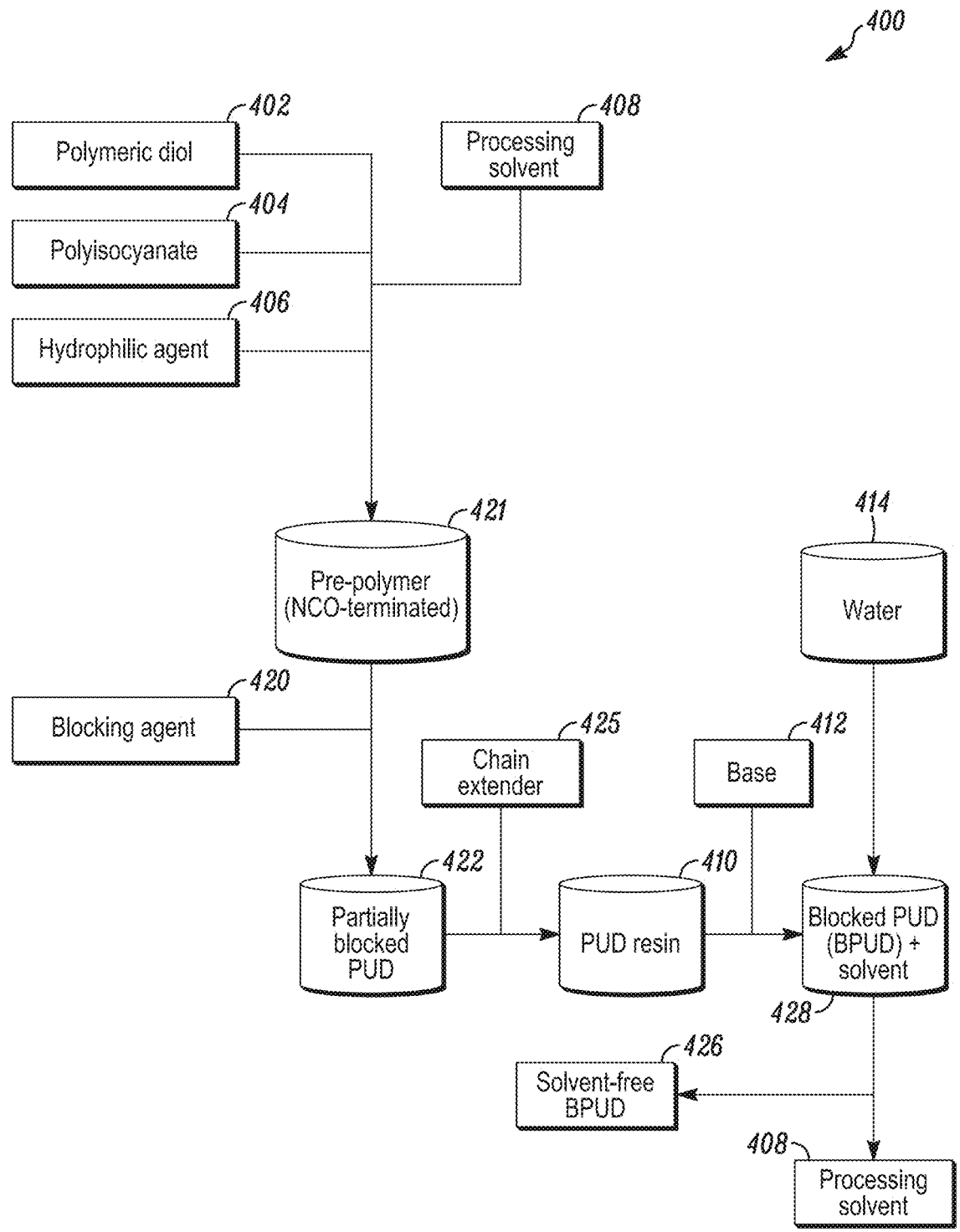
FIG. 3*b* is a diagram of a solvent-free PUD manufacturing process including introduction of a blocking agent to a pre-polymer to produce a solvent-free blocked PUD.

For example, referring to FIGS. 3a and 3b, the traditional and solvent-free manufacturing processes may be altered by including a blocking agent 320/420 after forming a pre-polymer 321 to form a partially blocked polyurethane pre-polymer 322/422 where at least one isocyanate group is blocked.

The partially blocked polyurethane pre-polymer 322/422 is generally of the formula:

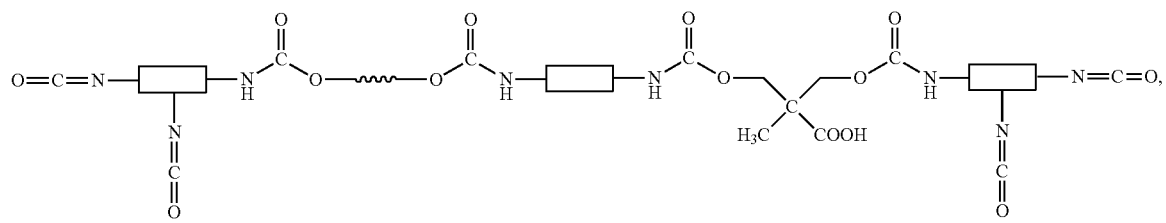

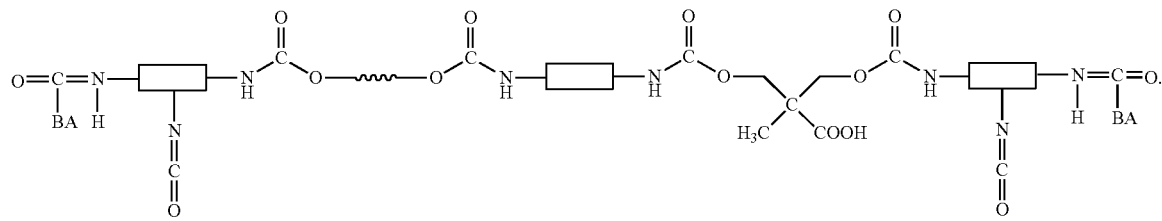

where BA signifies isocyanate groups that are blocked with the blocking agent. As can be seen in the formula above, some isocyanate groups remain unblocked, which are shown as the N=C=O groups in the above formula. In various embodiments, the partially blocked polyurethane pre-polymer 322/422 may be reacted with a chain-extender 325/425, such as a diamine or triamine, to form a partially blocked and chain-extended prepolymer of the formula:

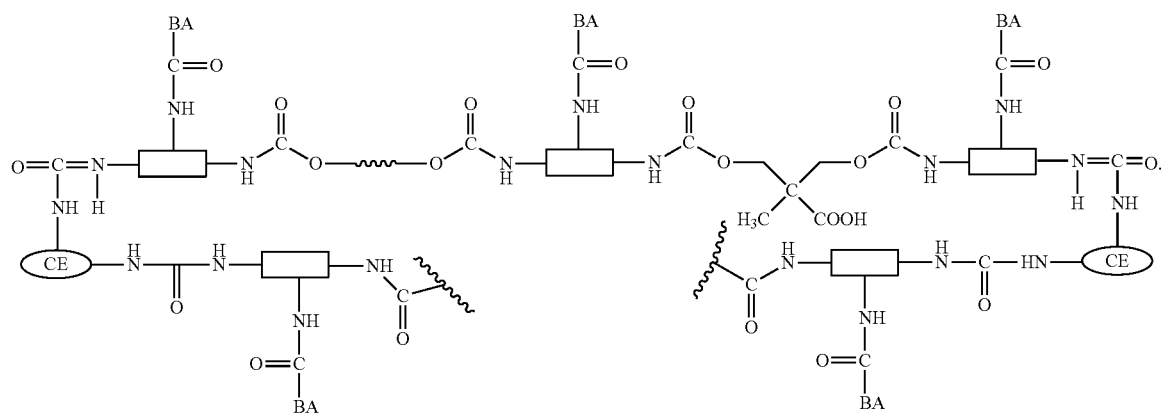

The blocked PUD 326/426 formed from partially blocked polyurethane pre-polymer 322/422 through either process may then be applied as a coating or film on a substrate similar to the unblocked PUD.

With continued reference to FIGS. 3a and 3b, a blocked PUD 326/426 may be formed from the partially blocked polyurethane pre-polymer 322/422 using the traditional PUD manufacturing process 300 similar to that discussed above in Part II(A) (FIG. 3a) or using the solvent-free PUD manufacturing process 400 similar to that discussed above in Part II(B) (FIG. 3b).

Referring to FIG. 3a and using the traditional PUD manufacturing process 300, a polyisocyanate 304 may be reacted with polymeric diol 302 and hydrophilic agent 306 in the presence of one or more of the solvents 108 discussed above in Part I to create the pre-polymer 321. The pre-polymer 321 may then be reacted with the blocking agent 320 to form a partially blocked pre-polymer 322, which may then be reacted with a chain extender 325 to form PUD resin 310. The PUD resin 310 may be subsequently mixed with at least one base or acid neutralizing agent 312 and dispersed in water 314 to create the blocked polyurethane dispersion (PUD) 326.

With reference to FIG. 3b and using the solvent-free PUD manufacturing process 400, a polyisocyanate 404 may be reacted with polymeric diol 402 and hydrophilic agent 406 in the presence of one or more of processing solvents 408 to create the pre-polymer 421. The pre-polymer 421 may then be reacted with the blocking agent 420 to form a partially blocked pre-polymer 422, which may then be reacted with a chain extender 425 to form PUD resin 410. The PUD resin 410 may be subsequently mixed with at least one base or acid neutralizing agent 412 and dispersed in water 414 to create a solution 428 including the blocked polyurethane dispersion (PUD) 426 and the processing solvent 408. The processing solvent 408 may be subsequently removed from the solution 428 of the blocked polyurethane dispersion 426 and the solvent 408 to create the solvent-free BPUD 426. For example, the solvent 408 may be removed from the solution 428 via distillation or other similar methods.

However, in order for the solvent-free BPUD 426 to exhibit good film formation, and to enhance film hardness, open time, drying time and other properties desired from water-borne polyurethane dispersions, a coalescing agent, namely one or more of the caprolactam-derived solvents discussed in Part I above, may be used to lower the minimum film forming temperature (MFFT) of the BPUD 426.

In various embodiments, one exemplary method of preparation of partially blocked PUDs using a partially blocked pre-polymer includes the steps of:

1. Reacting a polyisocyanate component in a caprolactam-derived solvent at 10-50 wt. % of the total composition mass with:
    a. 50 to 90 equivalent mol %, of the NCO groups being reacted with blocking agents that are capable of being de-blocked thermally;
    b. 0 to 25 equivalent mol % of the NCO groups being reacted with polymeric diols having a polyether, polyester, polyamide, polycarbonate, polyacrylic or alkyd backbone;
    c. 10 to 15 equivalent mol %, of the NCO groups being reacted with hydrophilic agents having hydroxyl and carboxylic groups; and d. 0 to 15% equivalent mol %, of the NCO groups being reacted with a chain-extender that is at least difunctional relative to NCO groups of the polyisocyanates;
2. Neutralizing the carboxylic groups of the above described polyurethane dispersion polymer which has no free NCO groups with a neutralizing agent; and
3. Dispersing the resulting polyurethane polymer in water or, optionally, a dispersing aid such as dimethylethanol amine can be used.

Another method includes altering the traditional and solvent-free manufacturing processes to include the use of a partially blocked polyisocyanate 524/624 formed by reacting a polyisocyanate 504/604 with a blocking agent 520/620. With reference to FIGS. 4a and 4b, a blocked PUD 526/626 may be formed from the partially blocked polyisocyanate 524/624 using the traditional PUD manufacturing process 500 similar to that discussed above in Part II(A) (FIG. 4a) or using the solvent-free PUD manufacturing process 600 similar to that discussed above in Part II(B) (FIG. 4b).

Figure 4A:
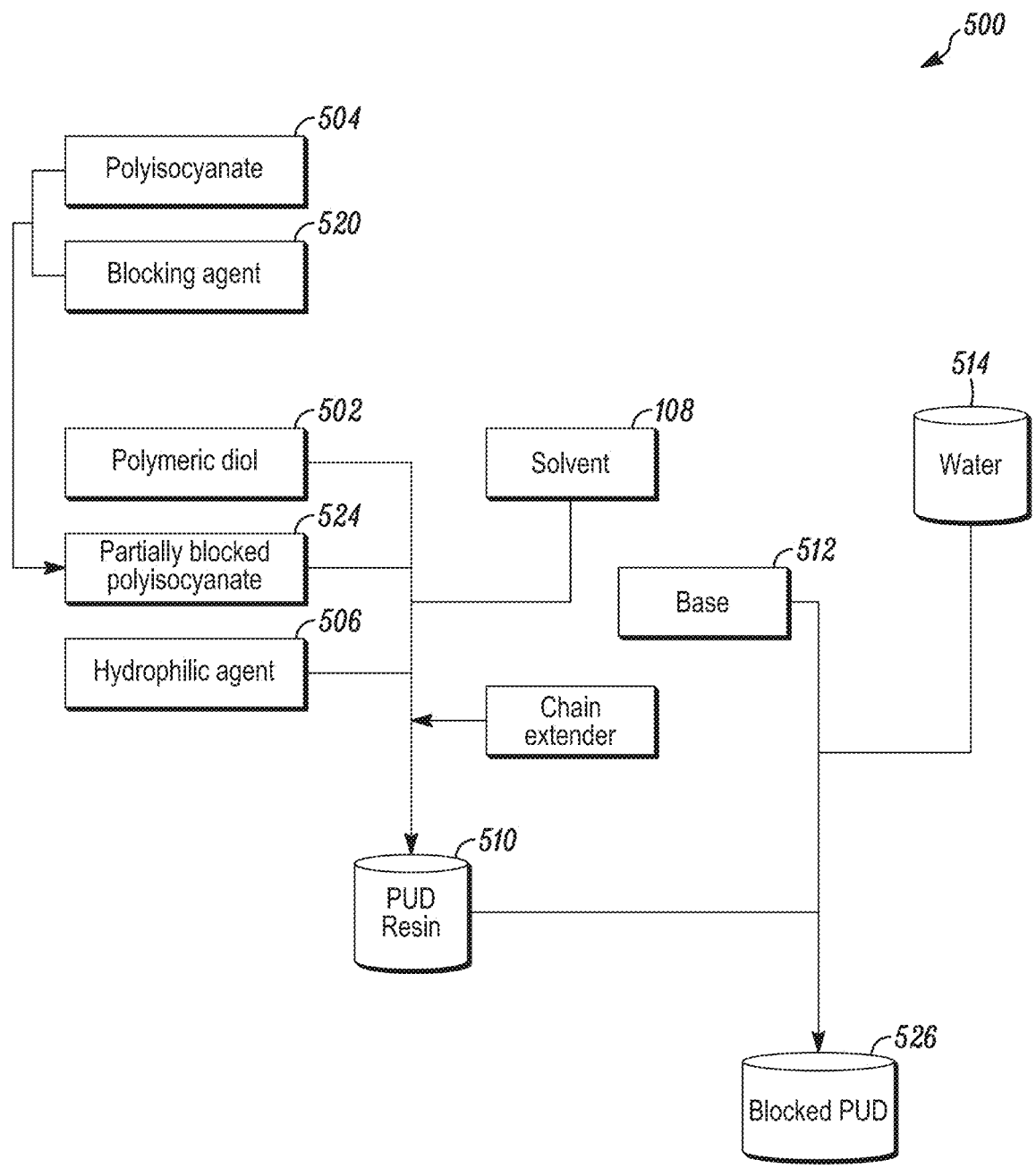
FIG. 4*a* is a diagram of a traditional PUD manufacturing process including introduction of a blocked isocyanate to produce a blocked PUD.

Referring to FIG. 4a and using the traditional PUD manufacturing process 500, the blocked isocyanate 524 may be reacted with polymeric diol 502 and hydrophilic agent 506 in the presence of one or more of the solvents 108 discussed above in Part I and a chain extender 525 to create the PUD resin 510. The PUD resin 510 may be subsequently mixed with at least one base or acid neutralizing agent 512 and dispersed in water 514 to create the blocked polyurethane dispersion (PUD) 526.

Figure 4B:
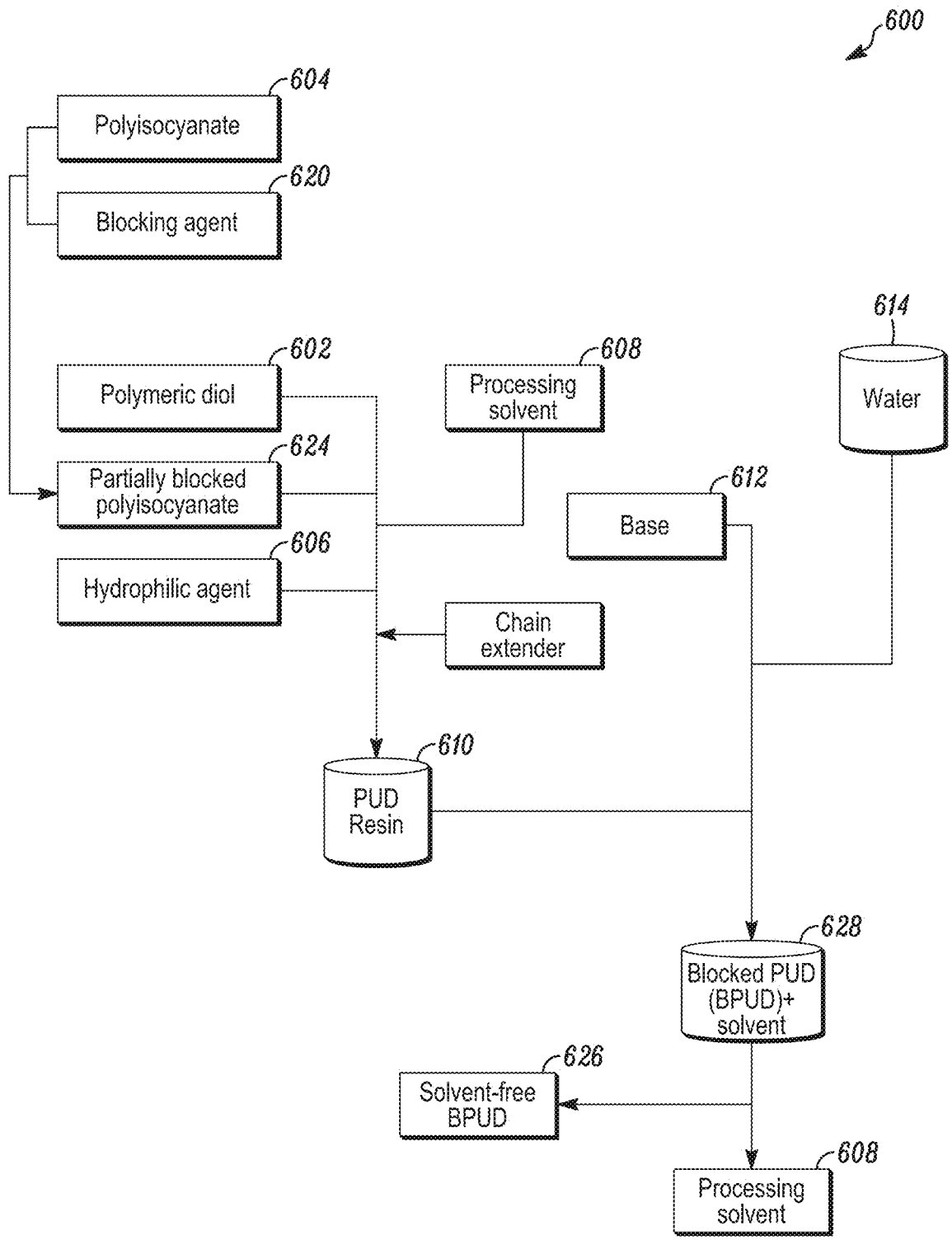
FIG. 4*b* is a diagram of a solvent-free PUD manufacturing process including introduction of a blocked isocyanate to produce a solvent-free blocked PUD.

With reference to FIG. 4b and using the solvent-free PUD manufacturing process 600, the blocked isocyanate 624 may be reacted with polymeric diol 602 and hydrophilic agent 606 in the presence of at least one processing solvent 608 and a chain extender 625 to create the PUD resin 610. The PUD resin 610 may be subsequently mixed with at least one base or acid neutralizing agent 612 and dispersed in water 614 to create a solution 628 of a blocked polyurethane dispersion (BPUD) 626 plus the solvent 608.

The processing solvent 608 may be subsequently removed from the solution 628 of the blocked polyurethane dispersion 626 and the solvent 608 to create the solvent-free BPUD 626. For example, the solvent 608 may be removed from the solution via distillation or other similar methods.

However, in order for the solvent-free BPUD 626 to exhibit good film formation, and to enhance film hardness, open time, drying time and other properties desired from water-borne polyurethane dispersions, a coalescing agent, namely one or more of the caprolactam-derived solvents discussed in Part I above, may be used to lower the minimum film forming temperature (MFFT) of the BPUD 626.

In various embodiments, one exemplary method for the preparation of blocked solvent-free PUDs using a blocked isocyanate includes the steps of:
1. Reacting a polyisocyanate component (e.g. Trimers of HDI, IPDI) in caprolactam-derived solvent at 10-50 wt. % of the total mass with:
   a. 10 to 25 equivalent mol %, based on the NCO groups is reacted with hydrophilic agents having hydroxyl and carboxylic groups;
   b. 10 to 15 equivalent mol % based on the NCO groups is reacted with polymeric diols having polyether, polyester, polyamide, polycarbonate, polyacrylic, alkyd, castor oil or linseed oil backbone; and
   c. 60 to 80 equivalent mol %, based on the NCO groups is reacted with blocking agents that are capable of being de-blocked thermally.

Once applied, the blocked PUD undergoes a two-step cure instead of the one-step cure of the unblocked PUD. The first step of the two-step cure includes a dry cure in which the PUD partially cures on the surface of the substrate, wherein the water evaporates to leave the coating or film, and particles of the PUD coalesce to form a thick sticky layer or film. Since the dry cure typically occurs at room or ambient temperature, the blocked isocyanate groups remain blocked and unable to react with surrounding reactants. Subsequently, the second step of the cure includes a heat cure in which the PUD coating is heated at an elevated temperature as little as 80° C., 90° C., or 100° C., or as high as 130° C., 140° C., or 150° C., or within any range defined between any two of the foregoing values, such as 80° C. to 150° C., 90° C. to 140° C., or 100° C. to 130° C., for example, in which the de-blocked isocyanate groups undergo crosslinking.

Once the blocked PUD is heated, the blocked isocyanate groups liberate the blocking agent creating an unblocked PUD, allowing the unblocked isocyanate groups to react with moisture in the air or other components of the PUD, and the blocking agent and/or coalescing agent to leave the film. An example reaction of the heat cure is as follows:

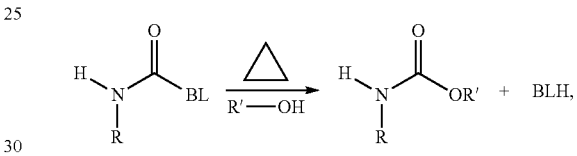

where BL is the blocking agent, R is the remainder of the PUD, and R' can be hydrogen, an acid, or and amine, for example.

Blocking agents suitable for use in the process according to the invention are, in particular, compounds with preferably one isocyanate-reactive group which enter into an addition reaction with organic isocyanates at temperatures above about 50° C. and preferably at temperatures in the range of from about 80° to 180° C., and whose resulting addition products, in admixture with involatile polyols containing primary hydroxyl groups, react with the involatile polyols to form urethanes at temperatures in the range of from about 100° to 200° C., the reaction being accompanied by liberation of the blocking agent. Suitable blocking agents of this type are, for example, alcohols including secondary or tertiary alcohols, such as isopropanol or tert-butanol, phenols such as phenol and nonylphenol, C—H-acid compounds, including compounds having active methylene groups, such as malonic acid diesters including dimethylmalonate, diethylmalonate, oximes, such as formaldoxime, acetaldoxime, acetone oxime, methyl ethyl ketoxime, methyl propyl ketoxime, methyl isopropyl ketoxime, cyclohexanone oxime, acetophenone oxime, 2-pentanone oxime, benzophenone oxime, butanone oxime, or diethyl glyoxime, pyrazole class of compounds such as 1,2-pyrazole, 3,5-dimethylpyrazole, 1,2,4-triazole, imidazole class of compounds such as ethyl imidazole, cylicamides including lactams such as caprolactam, ester amines such as alkylalanine esters, and other various blocking agents such as acetyl acetone, acetoacetic acid alkyl esters, benzyl-tert-butylamine, diisopropylamine, isopropylamine, ethyl acetoactetate and/or mixtures thereof.

IV. Properties
a. Viscosity
Viscosity is the extent to which a fluid resists a tendency to flow. The viscosity of a paint or coating will affect the ease of brushing, coverage, and tendency to spatter. Typically, a paint or coating is desired to have a viscosity in which it brushes with sufficient ease, properly covers the substrate it is applied to without brush marks, and has a small tendency to spatter. Viscosity may be determined in accordance with ASTM D4179-11. In general, the viscosity of a paint or coating of the present disclosure may be as low as 0.05 Pa·s, 0.08 Pa·s, 0.2 Pa·s, 0.5 Pa·s or 1.0 Pa·s, as high as 1 Pa·s, 1.5 Pa·s, 2 Pa·s, or 4 Pa·s, or within any range defined between any two of the foregoing values, such as 0.05-4 Pa·s, 0.05-2 Pa·s, 0.5-1.5 Pa·s, or 0.05-1 Pa·s, for example.

b. Storage Stability

Storage stability of a coating or paint correlates with its low shear viscosity (LSV). Thus, storage stability can be tested by viscosity measurements and microscopy before and after heat aging. In general, lower or more constant viscosities indicate good storage stability for a paint or coating. More specifically, lower or more constant viscosities indicate that the paint or coating would be useful for a longer period of time. For instance, PUDs of the present disclosure may have a storage stability of at least 6 weeks at 40° C. or alternatively may remain stable for 6 to 12 months.

Storage stability may be determined by evaluating viscosity measurements shortly after the PUD is prepared and after storage for either one month at room temperature or one month at 50° C.

c. Minimum Film Forming Temperature

The minimum film-forming temperature (MFFT) of a paint or coating is the lowest temperature at which the paint or coating will uniformly coalesce when applied to a substrate as a thin film. Thus, for effective use, it is important that paints and coatings be applied only to surfaces with a temperature above that of their MFFT. Accordingly, the lower the MFFT of a paint or coating, the more durability the paint or coating will exhibit over a wider variety of temperatures. Minimum film-forming temperatures may be determined in accordance with ASTM D 2354 and ISO 2115. In general, MFFT of a paint or coating of the present disclosure may be as low as −2.5° C., −2.0° C., −1.5° C., as high as −1.0° C., −0.5° C., or 0° C., or within any range defined between any two of the foregoing values, such as −2.5° C. to 0° C., −1.4° C. to 0° C., or −1.7° C. to −0.4° C., for example.

d. Film Formation

Film formation of a coating or paint is characterized by the efficiency of the coalescing agent to plasticize temporally the polymeric particles resulting in a continuous film formation. In general, a paint or coating with good film formation will show little to no cracking when applied in severe conditions. A paint or coating with good film formation is important for providing a constant film or coating that is not defective.

e. Open Time

The open time of a paint or coating is the length of time a paint remains "wet" or "open" enough to allow for brush-in and repair. Open time is a key performance property for coatings, particularly for brush applications.

Open time may be determined in accordance with ASTM D7488. In general, open time for a paint or coating of the present disclosure may be as low as 5, 10, or 15 minutes, as high as 20, 22, or 25 minutes, or within any range defined between any two of the foregoing values, such as 5-25 minutes, 10-22 minutes, or 14-22 minutes, for example. Advantageously, the longer the open time, the longer the paint or coating can be fixed before it dries. As such, if the paint of coating is scratched or marred after applied, the paint or coating can be modified for uniform thickness, etc., by the user before the paint or coating begins drying. In addition, longer open times can reduce overlapping coating defects when the paints or coatings are applied over large areas. Longer open times are also useful for decorative techniques, such as feathering or glazing. Further benefits of longer open times also include reduced labor and material costs in requiring less time and supplies to fix defects. Longer open time can also be important for small scale jobs such as crafts, trim painting and finger nail polish as well.

f. Drying Time

The drying time of a paint or coating is the length of time it takes the paint or coating to reach a stage where the applied paint or coating can just be touched, or sand impinging on the surface of the drying coating, can be brushed off, without damaging the surface of the coating. The drying times of a paint or coating are significant in determining when a freshly painted or coated room, floor, or stair, for example, may be put back in use or a coated article may be handled or packaged. In general, paints or coatings have many different surface drying times but in general they all fall roughly into one of the following categories: ultra quick dry (0-5 minutes), quick dry (5-20 minutes), 0.5 to 1 hour, 1.5-3 hours, or 4-8 hours. Advantageously, the shorter the dry time, the quicker the paint or coating is dry and the sooner the room or article may be used or recoated.

Drying time may be determined in accordance with ASTM D1640 or ASTM D5895. In general, the drying time for a paint or coating of the present disclosure may be as low as 10 minutes, 12 minutes, or 14 minutes, as high as 16 minutes, 18 minutes, or 20 minutes, or within any range defined between any two of the foregoing values, such as 10-20 minutes, 12-20 minutes, or 14-20 minutes, for example.

g. Persoz Hardness

Hardness is related to the dampening properties of an organic surface. Specifically, hardness is the resistance of a coating or paint to a mechanical force. A lower stiffness or resistance will result in deeper indentation of a ball of a testing apparatus into the material resulting in a faster dampening of the oscillations and finally, a lower hardness. Advantageously, a higher hardness indicates a stronger or more durable paint or coating. A coating or paint having a Persoz hardness of approximately 110 to approximately 135 is considered good.

Persoz hardness may be determined in accordance with ISO 522. In general, the hardness at 28 days for a paint or coating of the present disclosure may be as low as 100 seconds, 110 seconds, or 115 seconds, as high as 120 seconds, 125 seconds, or 130 seconds, or within any range defined between any two of the foregoing values, such as 100-130 seconds, 104-130 seconds, or 104-127 seconds, for example.

h. Gloss and Color

Gloss is the smoothness of the coating or paint and/or substrate on a microscopic level. When the coating or paint and/or substrate are both very smooth, light will reflect in a uniform direction creating a high gloss finish. On the other hand, when the coating or paint and/or substrate are both rough on a microscopic level, light will scatter in multiple directions creating a lower gloss or a flat finish. When measuring gloss, a value can be given to a finish by looking at the finish at different angles. In general, 100 is typically the highest value for gloss and zero is the lowest.

High gloss finishes typically have a value of 70 through 100 and need to be measured with a 20° gloss meter, glosses ranging from 10 and 70 should be measured with a 60° gloss meter, and flat finishes from 0 through 10 should be measured with an 85° gloss meter.

Gloss may be determined in accordance with ISO 2813 and USO 7724-2. In general, the gloss of the paints and/or coatings of the present disclosure may be as low as 1.0-1.5 when measured with a 20° gloss meter, 2.5-3.5 when measured with a 60° gloss meter, and 15-35 when measured with an 85° gloss meter, or within any range defined between any two of the foregoing values.

i. Scrub Resistance

Scrub resistance is the ability of the paint or coating to resist wearing or degradation once the paint or coating has dried to form a film. The wear or degradation is assessed either visually or by weight or thickness loss. The importance of evaluating the scrub resistance of a paint is to confirm that it will maintain the expected visual appearance after washing with a brush or cloth to remove dirt and other markings, and that it will maintain its physical properties, i.e., no softening, blistering, or thinning, when exposed to cleaning products. If the paint or coating shows any visual changes in appearance when compared to a non-scrubbed area, then the paint is said to possess poor scrub resistance.

Scrub resistance may be determined in accordance with ISO 11998. In general, the weight loss of the paints and/or coatings of the present disclosure may be as low as 2.0 g/m$^2$ or 2.5 g/m$^2$, as high as 4.0 g/m$^2$ or 4.5 g/m$^2$, or within any range defined between any two of the foregoing values, such as 2.0-4.5 g/m$^2$ or 2.4-4.4 g/m$^2$, for example, and the loss of thickness of the paints and/or coatings of the present disclose may be as low as 1.0 μm or 1.5 μm, as high as 2.5 μm or 3.0 μm, or within any range defined between any two of the foregoing values, such as 1.0-3.0 μm or 1.5-3.0 μm, for example.

j. Freeze/Thaw Stability

Freeze/thaw stability characterizes the ability of a paint or coating to withstand changes in temperature that can often be substantial. In general, a paint or coating with good freeze/thaw stability has the ability to be cycled through various changes in temperature and still be useful as a paint or coating. A good freeze/thaw stability is advantageous as it allows the user to store a paint in any temperature and the paint or coating will remain useful even if the temperature of the paint or coating has changed drastically, thus resulting in a longer lasting paint or coating. Freeze/thaw stability may be determined in accordance with ASTM D2243-95.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Example 1—Solubility of Solvents

Solubility was tested between the various solvents to determine their applicability in the PUD manufacturing processes. Solubility is the amount of a substance (coalescing agent) that dissolves in a unit volume of a liquid substance (solvent) to form a saturated solution under specified conditions of temperature and pressure. For the examples, amounts of depomedroxyprogesterone acetate (DMPA) were dissolved in each solvent. As seen in Table 1 below, dimethylformamide (DMF) provided the best solubility at 63.9 grams of DMPA in 100 grams of solvent, followed by NMP (54.0 grams of DMPA), n-methyl caprolactam (N-MeCPL) (27.5 grams of DMPA), a mixture of N-MeCPL and n-ethyl caprolactam (N-EtCPL) in a ratio of 2:1 (25.0 grams of DMPA), a mixture of N-MeCPL and N-EtCPL in a ratio of 1:1 (22.5 grams of DMPA), a mixture of N-MeCPL and N-EtCPL in a ratio of 1:2 (20.0 grams of DMPA), N-EtCPL (20.0 grams of DMPA), 3-n-butylphthalide (NBP) (20.0 grams of DMPA), esteramine (10.0 grams of DMPA), n-butyl caprolactam (N-BuCPL) (10.0 grams of DMPA), and esteramide (10.0 grams of DMPA). While the caprolactam-derived solvents (N-MeCPL, N-EtCPL, N-BuCPL) do not have as high of a solubility of NMP and DMF, the solubility of N-MeCPL, and the mixtures of N-MeCPL and N-EtCPL in ratios of 2:1 and 1:1 is sufficient to adequately dissolve DMPA for the manufacturing of PUDs.

TABLE 1

Solubility of DMPA in Solvents

| Solvents | Solubility (g/100 g of Solvent) |
| --- | --- |
| DMF | 63.9 |
| NMP | 54.0 |
| N—MeCPL | 27.5 |
| N—MeCPL/N—EtCPL - 2:1 | 25.0 |
| N—MeCPL/N—EtCPL - 1:1 | 22.5 |
| N—MeCPL/N—EtCPL - 1:2 | 20.0 |
| N—EtCPL | 20.0 |
| NBP | 20.0 |
| Esteramine | 10.0 |
| N—BuCPL | 10.0 |
| Esteramide | 10.0 |

Example 2—Compatibility of Coalescing Agents with PUD Resins

Coalescing agents were also tested for their compatibility with pure polyurethane dispersion resins and for visual observation of the film for transparency, homogeneity, and phase separation. In order to properly test these properties, pigments and other opacifying materials were not added to the formulations. The samples were made by mixing a solvent-free polyurethane dispersion, Alberdingk® PUR-MATT 970 VP, having 34-36% solids with 5 wt. % (based on the polyurethane resin) of the coalescing agent.

a. Visual Observation of PUD Film

The transparency, homogeneity, and phase separation of each film was observed once each of the films has dried. With reference to Table 2 below, visual observation of the films showed that caprolactam-derived solvents, N-methyl and N-ethyl, exhibited good film properties, i.e., good transparency and homogeneity.

TABLE 2

Visual Evaluation of Dry Film

| Composition | Visual Evaluation of Dry Film |
| --- | --- |
| Resin* only | micro cracks |
| Resin + Ester alcohol | bubbles & cracks |
| Resin + N-butyl pyrrolidone (NBP) | Pass |
| Resin + Ester amide$^a$ | Pass |
| Resin + N-methyl CPL | Pass |

TABLE 2-continued

Visual Evaluation of Dry Film

| Composition | Visual Evaluation of Dry Film |
|---|---|
| Resin + N-ethyl CPL | Pass |
| Resin + N-butyl CPL | agglomerates |

*PU Alberdingk PURMatt 970VP
<sup>a</sup>Hexanoic acid, 6-(dimethylamino)-6-oxo, methyl ester b. Minimum Film Forming Temperature of Coalescing Agents Minimum film forming temperatures, MFFT, were measured using a MFFT temperature bar (MFFT-BAR) according to the standard test methods ASTM 2354 and ISO 2115, with the film having a thickness of 350 μm. With reference to Table 3 below, the MFFTs of the caprolactam-derived coalescing agents, N-methyl caprolactam (N-methyl CPL), N-ethyl caprolactam (N-ethyl CPL), N-butyl caprolactam (N-butyl CPL), ester alcohol, and ester amide, had similar or better MFFTs (−0.8±0.4, −1.4±0.3, and −1.3±0.3, respectively) than NBP (−0.4±0.2).

TABLE 3

MFFTs of Coalescing Agents

| Composition | MFFT (° C.) |
|---|---|
| Resin* only | 30 |
| Resin + Ester alcohol | 0 |
| Resin + N-butyl pyrrolidone (NBP) | −0.4 ± 0.2 |
| Resin + Ester amide<sup>a</sup> | −0.7 ± 0.2 |
| Resin + N-methyl CPL | −0.8 ± 0.4 |
| Resin + N-ethyl CPL | −1.4 ± 0.3 |
| Resin + N-butyl CPL | −1.3 ± 0.3 |

*PU Alberdingk PURMatt 970VP
<sup>a</sup>Hexanoic acid, 6-(dimethylamino)-6-oxo, methyl ester c. Persoz Hardness of Coalescing Agents Persoz hardness of each coalescing agent was measured according to the ISO 1552 standard test method. With reference to Table 4 below, the caprolactam-derived coalescing agents, N-methyl and N-ethyl, showed similar or higher Persoz hardness after 28 days in comparison to NBP and ester alcohol.

TABLE 4

Compatibility of Non-Pigmented PUDs with Pure Polyurethane Dispersion Resins

| | Persoz Hardness (sec) | | | | |
|---|---|---|---|---|---|
| Composition Resin* only | 2 Days | 7 Days | 14 Days | 21 Days | 28 Days |
| Resin + Ester alcohol | 75 | 97.6 | 107.4 | 113.4 | 116.8 |
| Resin + N-butyl pyrrolidone (NBP) | 70 | 103.2 | 110.4 | 115.4 | 117.8 |
| Resin + Ester amide<sup>a</sup> | 61 | 74.0 | 78.0 | 80.0 | 83.0 |
| Resin + N-methyl CPL | 72 | 103.0 | 113.2 | 116.8 | 117.8 |
| Resin + N-ethyl CPL | 73 | 102.0 | 112.0 | 118.0 | 118.0 |
| Resin + N-butyl CPL | 68 | 89.0 | 101.0 | 110.0 | 113.0 |

*PU Alberdingk PURMatt 970VP
<sup>a</sup>Hexanoic acid, 6-(dimethylamino)-6-oxo, methyl ester VI. Example 3—Coalescing Properties of the Caprolactam-Derived Solvents Various coalescing properties of caprolactam-derived solvents of the present disclosure were tested in comparison with other known coalescing agents such as 2, 2, 4-trimethyl-1,3-pentanediol monoisobutyrate, N-methyl pyrrolidone (NMP) and N-butyl pyrrolidone (NBP).

Tests were first performed to determine the coalescing agent level for pigmented and complete PUD formulations in order to achieve the optimum film formation. Complete paints were mixed with 0.7 wt. %, 1.5 wt. %, 3.0 wt. % and 5.0 wt. % of coalescing agents and applied on tin plated steel at a wet film thickness of around 250 μm, where the weight percentage was based on the pure polyurethane dispersion resins. The dry films were observed for cracking and surface defects using an optical microscope. Based on the observations, 3 wt. % dosage of coalescing agent was selected. Complete PUD formulations with pigments, fillers and other additives were prepared as per Table 5, and used to test and determine the coalescing properties of the caprolactam-derived solvents and other known coalescing agents.

TABLE 5

PUD-Pigmented Formulations

| Content | Source | Weight (parts) |
|---|---|---|
| Water | | 14.25 |
| Dispersant | Orotan ™ 731 | 1.3 |
| Antifoam | Tego ® foamex 810 | 0.1 |
| Rheology modifier | Aquaflow ™ NLS-205 | 0.4 |
| Pigment | Kronos ® 2190 | 18.4 |
| Calcium carbonate | Hydrocarb OG | 4.5 |
| Fillers | Sillitin Z 89 | 2.7 |
| Antifoam | Tego ® airex 902 W | 0.1 |
| Total | | 41.75 |
| Water | | 10.4 |
| Resin | Alberdingk ® PUR MATT 970 VP | 40 |
| Rheology modifier | Aquaflow ™ NLS-205 | 1.8 |
| Coalescing Agent | | 3.0 |
| Total | | 55.2 |
| TOTAL | | 96.95 |

Coalescing properties of caprolactam-derived solvents of the present disclosure were determined to be generally comparable or better than the other known coalescing agents.

a) Viscosity and Storage Stability

Dispersions and emulsions tend to aggregate polyurethane particles during storage. One way to determine the stability of a polyurethane dispersion is to measure viscosity of the polyurethane dispersion over time. Viscosity is a measure of a solvent's resistance to gradual deformation by shear stress or tensile stress. Exemplary formulations were tested for viscosities using a compression testing device to determine crush resistance in accordance with the ASTM D4179-11 standard, and titration techniques to determine degrees of termination. The storage stability of the dispersions was evaluated based on variations between viscosity measurements performed on paints shortly after their preparation and after their storage for either one month at room temperature or one month at 50° C. In general, the lower the viscosity of a solvent, the more stable the solvent, and thus the better the solvent.

Figure 5:
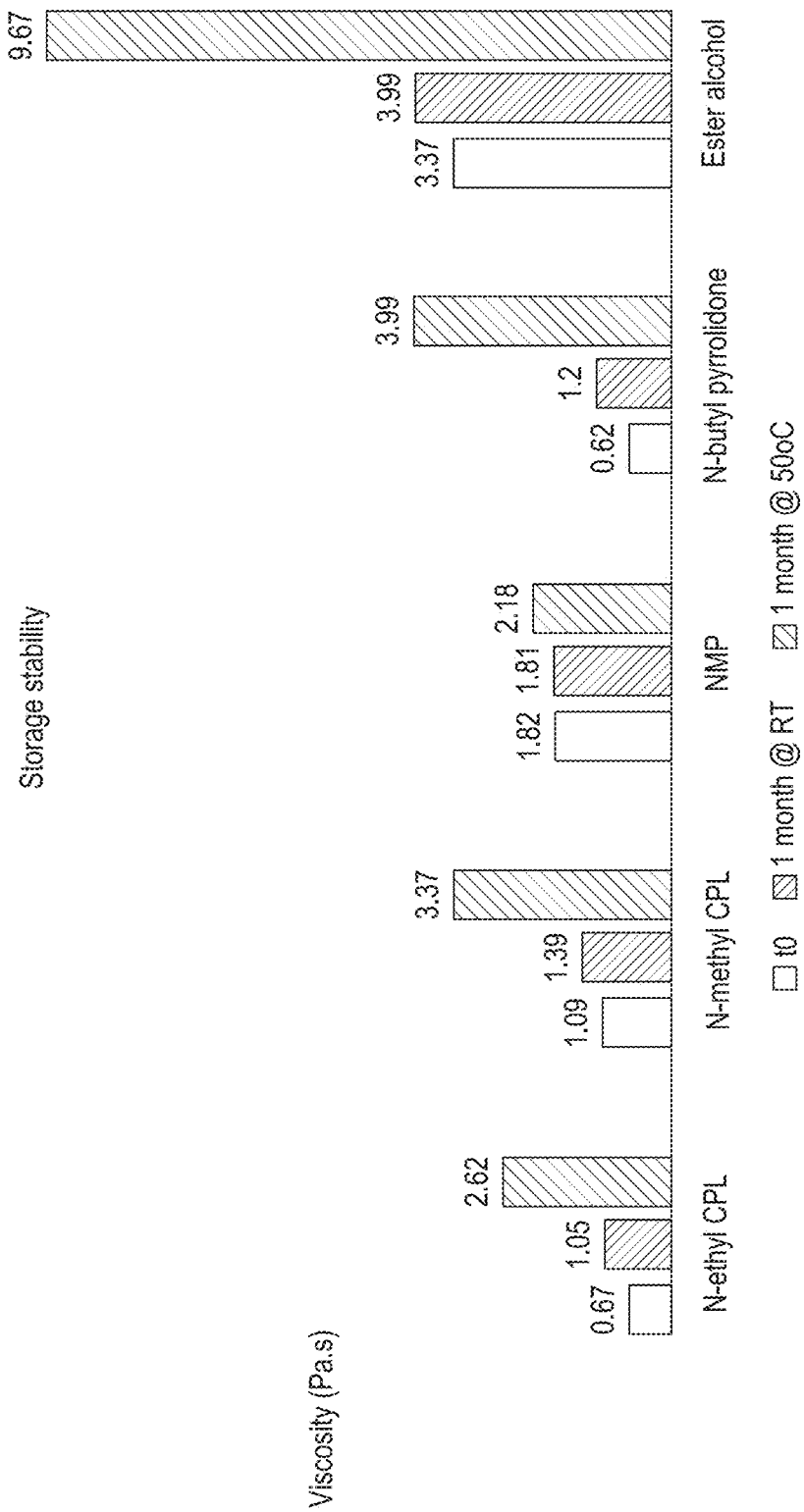
FIG. 5 corresponds to Example 3, and is a graph of storage stability and viscosities for various coalescing agents.

With reference to FIG. 5, the storage stability of pigmented PUD formulations using caprolactam-derived solvents, N-ethyl CPL and N-methyl CPL, showed overall better performance (low viscosity buildup) for the accelerated condition of 1 month at 50° C. as compared to NBP and similar performance as compared to NMP.

b) MFFT and Film Formation in Severe Conditions

The standard test for determining this temperature involves using a MFFT-BAR, as specified by standards ASTM D 2354 and ISO 2115. In general, the MFFT of a paint or coating is reduced temporarily by the use of coalescing agents.

Caprolactam-derived solvents of the present disclosure showed good MFFT in pigmented polyurethane dispersions. For instance, as seen below in Table 4, N-ethyl CPL had a lower temperature than NMP, and N-methyl CPL had a substantially similar temperature to NBP.

The efficiency of the coalescing agents to form films in severe conditions (4° C.) was also tested by applying the paints on tin plated steel at a humid thickness of 200 μm. As shown below in Table 6, N-methyl CPL, N-ethyl CPL, and N-butyl CPL all performed efficiently in severe conditions with no cracks detected, while NMP and ester alcohol had micro cracks.

TABLE 6

Minimum Film Forming Temperature of Pigmented and Complete PUDs and Observations of Film Formation in Severe Conditions

| Composition | MFFT (° C.) | Film Formation at 4° C.: Observation |
|---|---|---|
| N-ethyl CPL (NE CPL) | −2.4 | OK (no cracks) |
| N-methyl pyrrolidone (NMP) | −1.4 | micro cracks |
| N-methyl CPL (NM CPL) | −0.8 | OK (no cracks) |
| N-butyl pyrrolidone (NBP) | −0.7 | OK (no cracks) |
| Ester alcohol | −0.4 | micro cracks |
| Ester amide[a] | −0.6 | general cracks |
| 1:2 NE CPL:NM CPL | — | OK (no cracks) |
| 1:1 NE CPL:NM CPL | — | OK (no cracks) |
| 2:1 NE CPL:NM CPL | — | OK (no cracks) |

[a] = 2,2,4-trimethyl-1,3-pentanediol monoisobutyrate c) Open Time

Open times were determined according to the ASTM D7488 "Test Method for Open Time of Latex" standard and the tests were performed under controlled temperature and humidity (23±2° C. and 50±5% RH). In general, the paints were applied at a wet film thickness of 200 μm on contrasting sealed charts by means of a doctor blade applicator, and "X" marks are made immediately with the wide curved end of a wooden paint brush. After a determined time internal, the brush was dipped into the paint to be tested and brushing of the X-marks was started in perpendicular direction to the initial drawdown using 10 strokes back and forth to work the paint under test into the drawdown area. This procedure is repeated after several time intervals. After their complete drying (1 week), the painted panels are observed by two different observers and the time for which the "X" marks to become visible is considered as the open time.

Figure 6:
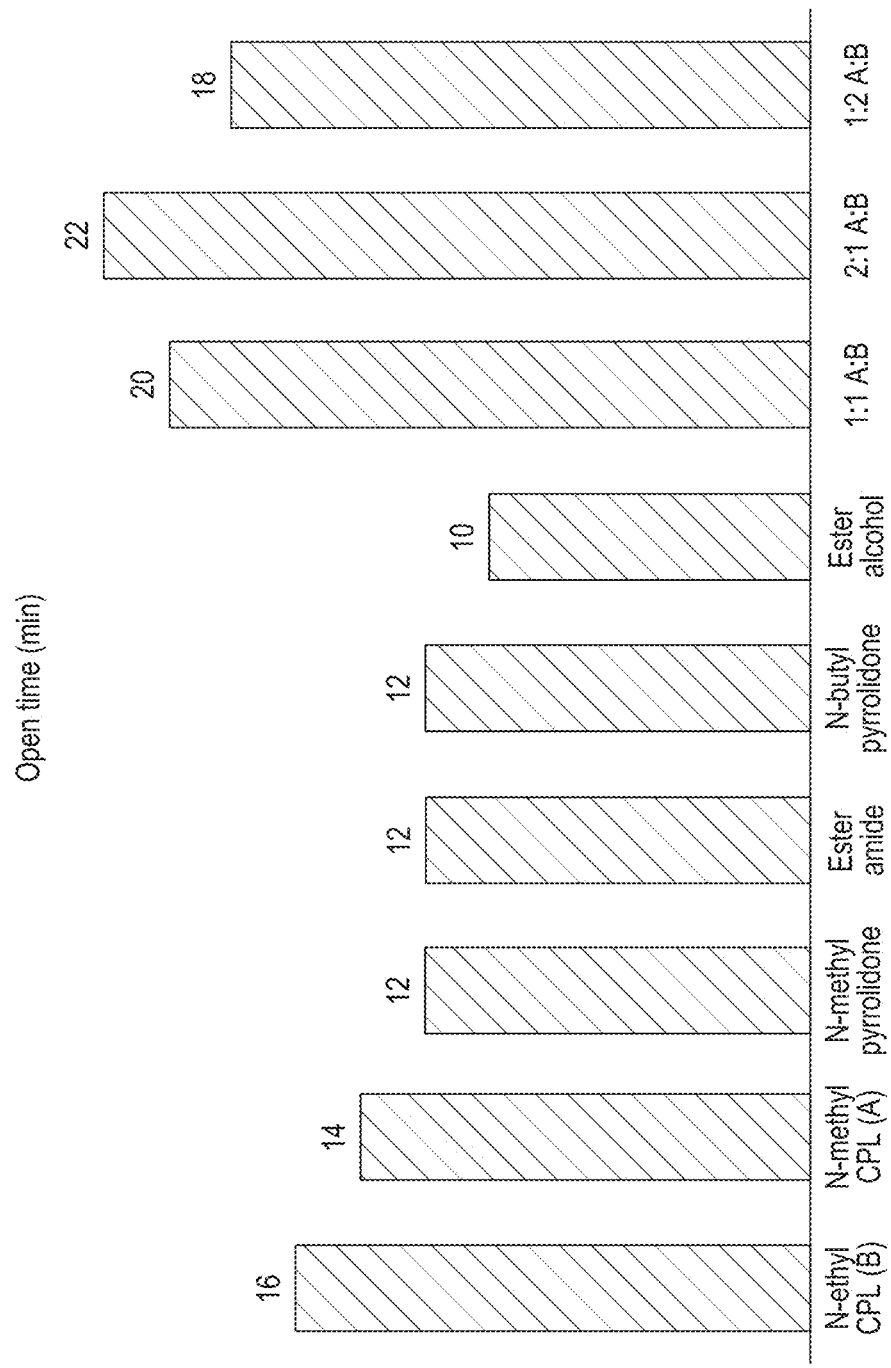
FIG. 6 corresponds to Example 3, and is a graph of open times for various coalescing agents.

With reference to FIG. 6 and Table 7 below, caprolactam-derived solvents, N-ethyl CPL and N-methyl CPL, had longer open times, 16 minutes and 14 minutes, respectively, than other coalescing agents, such as NMP, 12 minutes, and NBP, 12 minutes, and ester amide had a similar open time to NMP and NBP, specifically, 12 minutes. However, blends of caprolactam-derived solvents, 1:1 N-ethyl CPL:N-methyl CPL, 1:2 N-ethyl CPL:N-methyl CPL, and 2:1 N-ethyl CPL:N-methyl CPL, had even longer open times, 20 minutes, 22 minutes, and 18 minutes, respectively, than both caprolactam-derived solvents alone or other coalescing agents. Advantageously, blends of caprolactam-derived solvents, 1:1 N-ethyl CPL:N-methyl CPL, 1:2 N-ethyl CPL:N-methyl CPL, and 2:1 N-ethyl CPL:N-methyl CPL also had open times, 20 minutes, 22 minutes, and 18 minutes, respectively, that were longer than their drying times, 17.7 mins, 15.9 mins, and 16.4 mins, respectively.

d) Drying Time

The drying times for the pigmented PUD formulations were determined according to the ASTM D1640 "Standard Test Methods for Drying, Curing, or Film Formation of Organic Coatings" standard or the ASTM D5895 "Standard Test Methods for Evaluating Drying or Curing During Film Formation of Organic Coatings Using Mechanical Recorders" standard. Four stages of drying can be identified depending on the trace left by the needle on the paint surface: Stage 1—Set-to-Touch time, Stage 2—Tack-Free time, Stage 3—Dry-Hard time, and Stage IV—Dry trough time. However, Stage IV is often hard to detect.

In general, the paints were applied at a humid film thickness of 200 μm by means of a bar coater on a Leneta sheet and the needle rate was set at 60 cm/hr.

Figure 7:
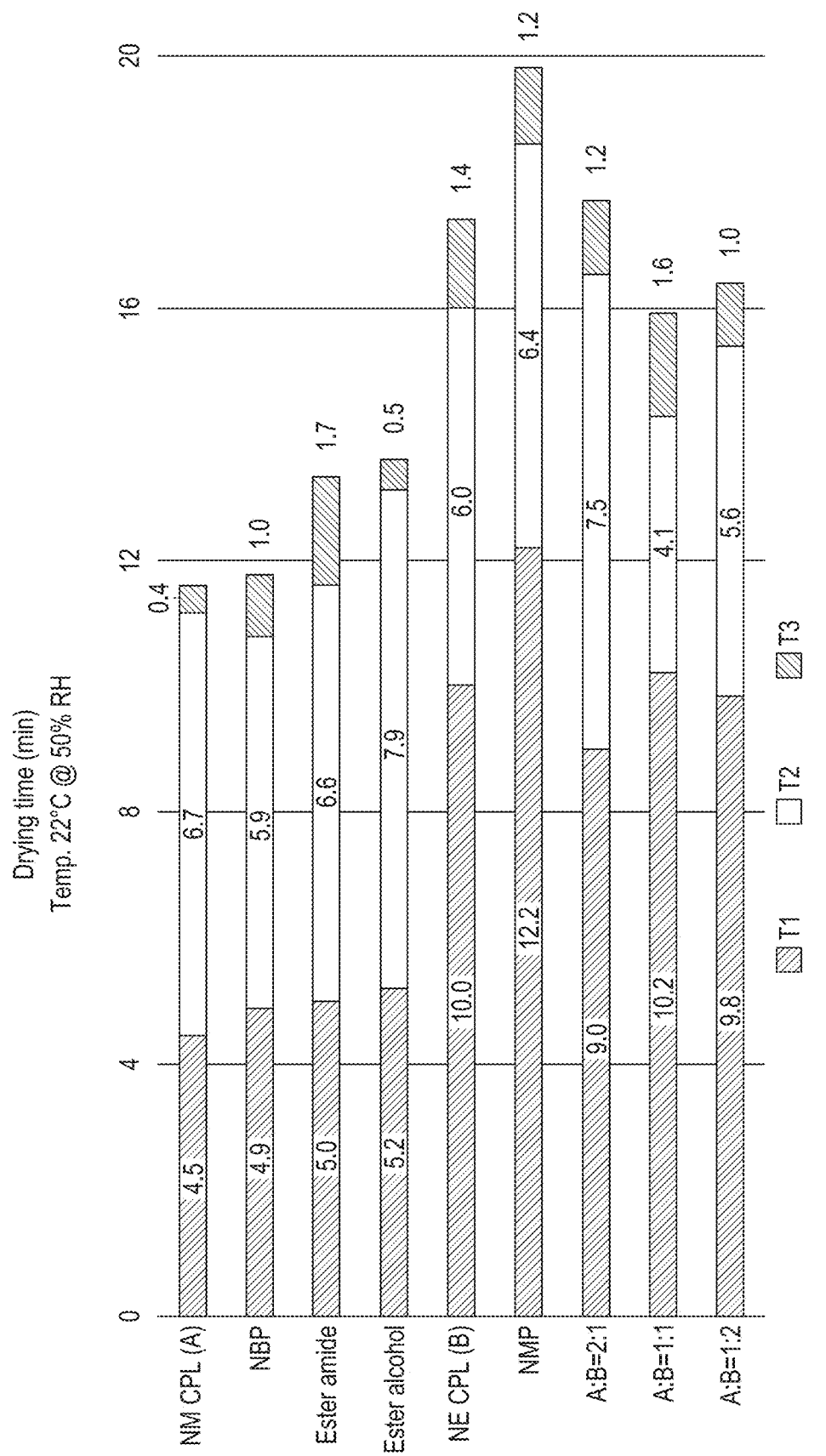
FIG. 7 corresponds to Example 3, and is a graph of drying times for various coalescing agents.

For the present examples, the drying times for the 2:1 A:B, 1:1 A:B, and 1:2 A:B solvents were determined using the ASTM D1640 standard, and the drying times for NM CPL, NE CPL, NMP, NBP, ester amide, and ester alcohol were determined using the ASTM D5895 standard. With reference to FIG. 7 and Table 7 below, overall, caprolactam-derived solvents, N-methyl (NM CPL), N-ethyl (NE CPL), ester amide, and ester alcohol and the blends (2:1, 1:1, 1:2) of NM CPL and NE CPL, had shorter drying times (11.6 minutes, 17.4 minutes, 13.3 minutes, 13.6 minutes, 17.7 mins, 15.9 mins, and 16.4 mins, respectively) as compared to NMP (19.8 minutes), and NM CPL had a similar drying time (11.6 minutes) as compared to NBP (11.8 minutes).

TABLE 7

Open and Drying Times

| Composition | Drying Time (min) | Open Time (min) |
|---|---|---|
| NM CPL (A) | 11.6 | 14 |
| NE CPL (B) | 17.4 | 16 |
| 2:1 A:B | 17.7 | 20 |
| 1:1 A:B | 15.9 | 22 |
| 1:2 A:B | 16.4 | 18 |
| NMP | 19.8 | 12 |
| NBP | 11.8 | 12 |
| Ester amide | 13.3 | 12 |
| Ester alcohol | 13.6 | 10 |

From the above Table, it may be observed that blends of the solvents typically have shorter drying times than open times, whereas the solvents themselves and other solvents typically have longer drying times than open times.

e) Persoz Hardness

Hardness is related to the dampening properties of organic surfaces. A lower stiffness will result in deeper indentation of the ball into the material resulting in a faster dampening of the oscillations and finally, a lower hardness.

Persoz hardness measurements were performed on pigmented paints that were applied on tin plated steel using a doctor blade applicator at a dry film thickness (DFT) around 50 μm according to the ISO 1522 standard. With reference to Table 8 below, twenty-eight (28) day hardness for the caprolactam-derived solvents was shown to be similar to that of other coalescing agents. For instance, the 28 day hardness for N-ethyl caprolactam (NE CPL) was approximately 104.6±0.5, while the 28 day hardness for NMP was approximately 108.8±2.4, and the 28 day hardness for ester alcohol and N-methyl caprolactam (NM CPL) were approximately 124.8±1 and 126.0±1, respectively, while the 28 day hardness for NBP was approximately 135.8±5. In addition, the hardness of paints or coatings with the blends of NM CPL and NE CPL were shown to be in a similar range, for example the blends of NM CPL and NE CP1 were approximately 110-120 seconds, while the hardness of NMP and NBP were approximately 105-140 seconds.

TABLE 8

Persoz Hardness of Pigmented and Complete PUDs

| Composition | Thickness (mm) | 1 Day | 7 Days | 14 Days | 21 Days | 28 Days |
|---|---|---|---|---|---|---|
| Ester alcohol | 42.2 | 98.2 ± 3 | 118.0 ± 1 | 120.0 ± 2 | 122.0 ± 2 | 124.8 ± 1 |
| NBP | 45.2 | 64.4 ± 3 | 127.0 ± 2 | 133.2 ± 5 | 136.6 ± 6 | 135.8 ± 5 |
| NMCPL | 46.8 | 95.2 ± 1 | 101.2 ± 3 | 122.0 ± 3 | 124.0 ± 3 | 126.0 ± 1 |
| NMP | 54.7 | 94.2 ± 0.4 | 101.0 ± 2.4 | 100.6 ± 1.7 | 107.6 ± 1.3 | 108.8 ± 2.4 |
| NE CPL | 52.2 | 101.0 ± 1.0 | 102.0 ± 0.7 | 101.4 ± 2.6 | 104.0 ± 2.8 | 104.6 ± 0.5 |
| 1:1 NM CPL:NE CPL | 78.2 | 79.0 ± 1.0 | 101.0 ± 1.0 | 102.4 ± 1.0 | 104.1 ± 1.0 | 111 ± 3 |
| 2:1 NM CPL:NE CPL | 90.8 | 94.2 ± 1 | 103.0 ± 1.0 | 106.1 ± 1.0 | 105.0 ± 1.2 | 116 ± 2 |
| 1:2 NM CPL:NE CPL | 80 | 80.0 ± 11 | 102.0 ± 1.0 | 105.0 ± 1.1 | 103.1 ± 1.1 | 115 ± 3 | f) Gloss and Color

Gloss measurements serve as an indicator of the paints surface quality. Gloss and color measurements were determined according to the ISO 2813 standard and the ISO 7724-2 standard (SCI-D65/10°), respectively.

With reference to Tables 9 and 10, the gloss and color measurements of the caprolactam-derived solvents, n-methyl (NM CPL), n-ethyl (NE CPL), and their blends, showed an increase in gloss and did not affect the color (i.e., no yellowing).

TABLE 9

Gloss of Pigmented and Complete PUDs

| Composition | 20° | 60° | 85° |
|---|---|---|---|
| Ester alcohol | 1.3 ± 0 | 3.0 ± 0 | 19.6 ± 0.3 |
| Ester amide | 1.3 ± 0 | 3.3 ± 0 | 24.2 ± 0.2 |
| NBP | 1.3 ± 0 | 2.8 ± 0 | 19.9 ± 0.2 |
| NMP | 1.3 ± 0 | 3.6 ± 0 | 30.7 ± 0.6 |
| NM CPL | 1.3 ± 0 | 3.0 ± 0 | 23.2 ± 0.2 |
| NE CPL | 1.3 ± 0 | 3.0 ± 0 | 24.5 ± 0.5 |
| 1:1 NM CPL:NE CPL | 1.3 ± 0 | 3.0 ± 0 | 23.3 |
| 2:1 NM CPL:NE CPL | 1.3 ± 0 | 3.1 ± 0 | 24.2 |
| 1:2 NM CPL:NE CPL | 1.3 ± 0 | 3.1 ± 0 | 24.7 |

TABLE 10

Color of Pigmented and Complete PUDs

| Composition | Color (White background) | | | Color (Black background) | | |
|---|---|---|---|---|---|---|
| | L* | a* | b* | L* | a* | b* |
| Ester alcohol | 95.6 | −0.51 | 3.16 | 94.93 | −0.87 | 2.30 |
| Ester amide | 94.98 | −0.51 | 3.29 | 93.84 | −1.05 | 2.03 |
| NBP | 95.01 | −0.56 | 3.32 | 94.00 | −1.04 | 2.20 |
| NMP | 95.14 | −0.52 | 3.02 | 94.55 | −0.88 | 2.20 |
| NMCPL | 95.07 | −0.52 | 3.32 | 94.09 | −0.97 | 2.25 |
| NE CPL | 95.04 | −0.61 | 3.24 | 94.45 | −0.92 | 2.46 |
| 1:1 NM CPL:NE CPL | N/A | N/A | N/A | 94.48 | −0.95 | 2.22 |
| 2:1 NM CPL:NE CPL | N/A | N/A | N/A | 94.50 | −0.94 | 2.37 |
| 1:2 NM CPL:NE CPL | N/A | N/A | N/A | 94.33 | −1.03 | 2.28 | g) Scrub Resistance

Scrub resistance was tested according the ISO 11998 "Paints and Varnishes—Determination of Wet-Scrub Resistance and Cleanability of Coatings" standard. In this testing method, the paint was applied on a test panel (Leneta sheet) using a film applicator at the specific gap clearance. After drying and conditioning for four weeks at room temperature the coated panel was weighed and subject to 200 wet-scrub cycles in a scrub resistance machine. The panel was then washed, dried and weighed to determine the loss from which the mean loss in film thickness was calculated. With reference to Table 11 below, caprolactam-derived coalescing agents showed better film formation and the paints were more resistant to the brush action as compared to NMP. For instance, N-methyl caprolactam (NM CPL), N-ethyl caprolactam (NE CPL), and blends thereof in the ratios of 1:2 and 1:1, all had less loss of thickness (2.035 μm, 1.797 μm, 1.39 μm, and 1.64 μm, respectively) as compared to NMP (2.090 μm) and NBP (2.213 μm). In addition, blends of caprolactam-derived solvents NM CPL and NE CPL showed the least amount weight loss (2.409 g/m² (1:1) and 2.955 g/m² (1:2)) as compared to the other coalescing agents.

TABLE 11

Scrub Resistance of Pigmented and Complete PUDs

| Composition | Wt. Loss (g/m²) | Loss of thickness after 200 wet-scrub cycles (μm) |
|---|---|---|
| Ester alcohol | 7.747 | 4.439 |
| Ester amide | 7.920 | 4.040 |
| NBP | 4.142 | 2.213 |
| NM CPL | 3.763 | 2.035 |
| NE CPL | 3.767 | 1.797 |
| NMP | 3.372 | 2.090 |
| 1:1 NM CPL:NE CPL | 2.409 | 1.39 |
| 2:1 NM CPL:NE CPL | 4.324 | 2.69 |
| 1:2 NM CPL:NE CPL | 2.955 | 1.64 | h) Freeze and Thaw Stability

Water-based emulsions and dispersions are susceptible to irreversible coagulation by freezing. Freeze and thaw stability was tested according the ASTM D2243-95 standard.

For these examples, pigmented PUD paints were subject to freeze-thaw cycles of 16 hours at −20° C. and 8 hours at room temperature and subsequently subject to visible observations. The paints were then applied on a tin plated steel plate at a thickness of approximately 200 μm for observing film properties.

Figure 8:
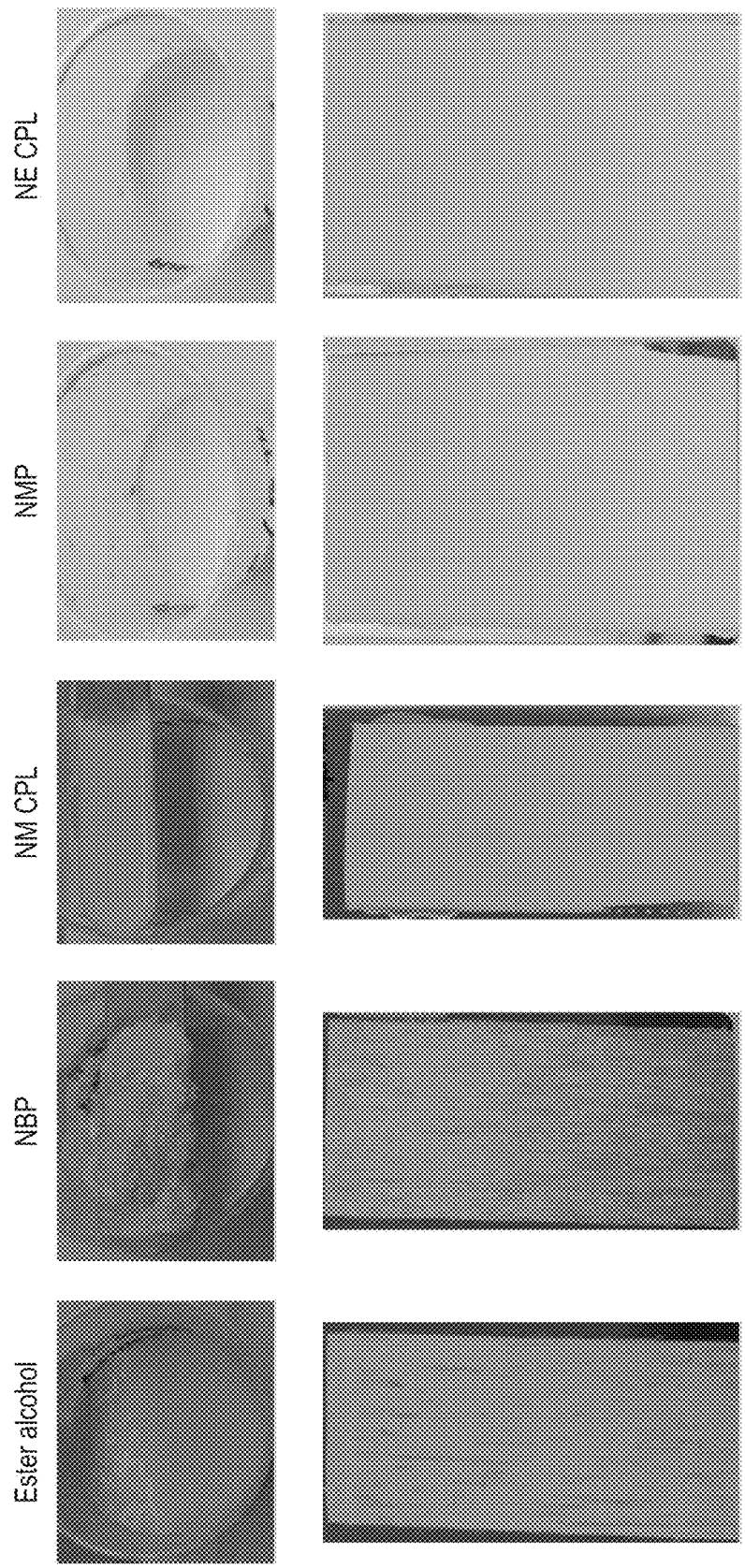
FIG. 8 corresponds to Example 3, and illustrates freeze-thaw stability and film properties for ester alcohol, NBP, N-methyl caprolactam (NM CPL), NMP, and N-ethyl caprolactam (NE CPL).
Figure 9:
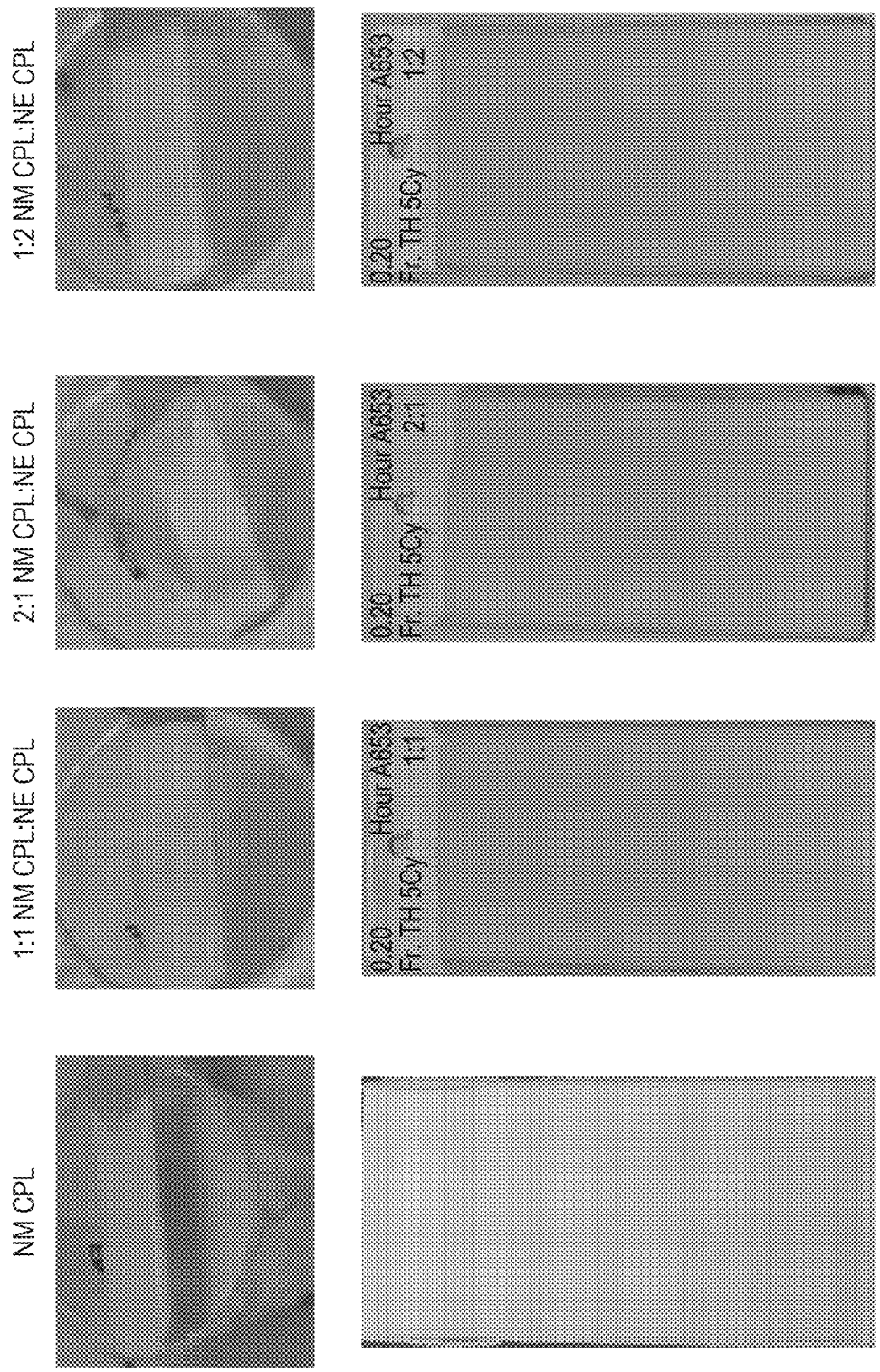
FIG. 9 corresponds to Example 3, and illustrates freeze-thaw stability and film properties of N-methyl caprolactam (NM CPL), 1:1 NM CPL:NE CPL, 2:1 NM CPL:NE CPL, and 1:2 NM CPL:NE CPL after being subject to five freeze-thaw cycles.

With reference to FIGS. 8 and 9, caprolactam-derived coalescing agents, N-methyl caprolactam (NM CPL) and N-ethyl caprolactam (NE CPL), and 1:1, 1:2, and 2:1 blends thereof showed better freeze-thaw stability and film properties than NBP and ester alcohol, and showed similar freeze-thaw stability as compared to NMP. In addition, the freeze-thaw stability was best for caprolactam-derived coalescing agents (NM CPL) and the blends even after subject to five cycles (see FIG. 9). In particular, the paints were visually observed after each cycle to see if there was any viscosity change, i.e., thickening of the paint. Then, the dry films of the coatings were observed visually. As may be seen from FIGS. 8 and 9, n-butyl pyrrolidone and ester alcohol showed thickening of the paint samples after two cycles, whereas N-methyl caprolactam showed no such viscosity change even after five freeze-thaw cycle and showed good film formation.

Example 5— Synthesis of Partially Blocked Polyurethane Dispersions

Example 5a—Synthesis of Partially Blocked Polyurethane Dispersions—Blocked Polyisocyanate A partially blocked polyurethane dispersion was synthesized using a blocked polyisocyanate by charging a reactor equipped with stirrer and condenser with 1.01 molar equivalent of a polyisocyanate, (e.g. HDI Trimer; Trade name: Desmodur N3300 from Covestro) in N-alkyl caprolactam or blends thereof, and heated to 50° C. under a nitrogen atmosphere. Subsequently, 0.7 molar equivalent of a blocking agent (e.g. 2-pentanone oxime or 2-butanone oxime) was added dropwise over a period of time (approximately 1 hour) and left at 60-70° C. until a constant NCO value was reached. To this partially blocked polyisocyanate, 0.1 molar equivalent of a diol (1,6-heaxne diol or hydroxyl terminated polyol) and 0.2 molar equivalent of dimethylol propionic acid (DMPA) were added and stirred at 80-90° C. until all the NCO groups were consumed (monitored by IR spectroscopy). The reaction mixture was cooled to 80° C. and 0.2-0.25 equivalent of a neutralizing agent (e.g. N,N-Dimethylethanolamine, or Triethyl amine) was added and the stirring continued for another 15-30 minutes. Deionized water (475-480 g/mol of polyisocyanate) was added with the content stirred at 50° C. for additional 2 hours. The content was then cooled to room temperature. The solid content of the dispersion was 37-38%, at a pH about 9.0.

Example 5b—Synthesis of Partially Blocked Polyurethane Dispersions—Blocked Pre Polymer A partially blocked polyurethane dispersion was synthesized using a blocked pre-polymer by charging into a reaction vessel equipped with a stirrer and a reflux condenser 1.0 molar equivalent of Hydroxyl terminated polyol (e.g. PTMG, $M_n$=1000 and 2000 gmol$^{-1}$), 1.0 molar equivalent of dimethylol propionic acid (DMPA) and 150 grams of N-alkyl caprolactam or blends thereof. While stirring at 70-75° C. under a nitrogen atmosphere, 2.67 molar equivalent of diisocyanate (MDI) in 150 grams of N-alkyl caprolactam or blends thereof was added to the reaction mixture. The change in isocyanate (NCO) content was monitored, using a standard titration (di-n-butylamine) until the theoretical endpoint was reached after approximately 3-4 hours. The reaction mixture was then cooled to 50-60° C. and a calculated amount of 1.335 molar equivalent of a blocking agent (e.g., 2-pentanone oxime or 2-butanone oximes or others), (an amount that molar equivalent of the residual free isocyanate (NCO) in the pre-polymer), in N-alkyl caprolactam or blends was added and monitored via IR spectroscopy until no residual NCO content was present. This blocked prepolymer was subject to a neutralization reaction with 1.0 molar equivalent of a neutralizer (trimethylamine or ammonia) at 50-60° C. for one hour and then dispersed in deionized water.

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:

1. A method of forming a polyurethane dispersion comprising the steps of:
   forming a polyurethane pre-polymer from a polymeric diol and at least one of a polyisocyanate and a diisocyanate, and a hydrophilic agent, the polyurethane pre-polymer dissolved in water and a processing solvent comprising N-ethyl caprolactam;
   adding at least one base to the pre-polymer;
   dispersing the pre-polymer in water to form a polyurethane dispersion, the polyurethane dispersion comprising N-ethyl caprolactam; and
   adding a coalescing agent to the polyurethane dispersion, the coalescing agent comprising N-ethyl caprolactam.

2. The method of claim 1, wherein the N-ethyl caprolactam in the polyurethane dispersion is present in an amount from 1 wt. % to 10 wt. %, based on a total weight of the polyurethane dispersion.

3. The method of claim 1, further comprising, after the dispersing step, the additional step of formulating the polyurethane dispersion into a coating composition comprising a resin and N-ethyl caprolactam.

4. The method of claim 1, wherein the polymeric diol includes at least one polymeric diol selected from a polyether polyol, a polyester polyol, a polycarbonate polyol, a polyamide polyol, an acrylic polyol and combinations thereof.

5. The method of claim 1, wherein the at least one of the polyisocyanate and the diisocyanate is diisocyanate, which includes at least one diisocyanate selected from an aliphatic diisocyanate and an aromatic diisocyanate and combinations thereof.

6. The method of claim 1, characterized in that the hydrophilic agent is selected from the group consisting of dimethylol propionic acid, dimethylol butanoic acid and combinations thereof.

7. The method of claim 6, wherein the hydrophilic agent is dimethylol propionic acid.

8. The method of claim 1, wherein the at least one base is an amine.

* * * * *